United States Patent [19]

Tsukamoto et al.

[11] Patent Number: 5,710,843
[45] Date of Patent: Jan. 20, 1998

[54] DOCUMENT PROCESSING APPARATUS HAVING A COMMUNICATION/FACSIMILE FUNCTION WITH SELECTIVE MEMORY SWITCHING

[75] Inventors: Takahiro Tsukamoto, Hoya; Naohiro Hosokawa, Kawasaki; Atsushi Nakamura, Yokohama, all of Japan

[73] Assignee: Canon Kabushiki Kaisha, Tokyo, Japan

[21] Appl. No.: 425,471

[22] Filed: Apr. 20, 1995

Related U.S. Application Data

[62] Division of Ser. No. 863,450, Apr. 3, 1992.

[51] Int. Cl.⁶ .................... H04N 1/00; H04N 1/40; G06F 9/00; G06F 9/46
[52] U.S. Cl. .................... 382/305; 358/437; 358/444; 379/100; 395/427; 395/650; 395/733; 395/734
[58] Field of Search .................... 358/444, 404, 358/400, 450, 403, 407, 437; 379/100; 395/427, 488, 489, 650, 733, 734, 868; 382/305

[56] References Cited

U.S. PATENT DOCUMENTS

| | | | |
|---|---|---|---|
| 4,545,015 | 10/1985 | Baunach et al. | 364/200 |
| 5,073,827 | 12/1991 | Nakajima | 358/437 |
| 5,126,858 | 6/1992 | Kurogane et al. | 358/450 |
| 5,291,305 | 3/1994 | Sakashita et al. | 358/444 |
| 5,386,298 | 1/1995 | Bronnenberg et al. | 358/403 |
| 5,404,231 | 4/1995 | Bloomfield | 358/407 |
| 5,425,462 | 6/1995 | Kim et al. | 358/444 |
| 5,448,375 | 9/1995 | Cooper et al. | 358/403 |

Primary Examiner—Edward L. Coles, Sr.
Assistant Examiner—Kimberly A. Williams
Attorney, Agent, or Firm—Fitzpatrick, Cella, Harper, & Scinto

[57] ABSTRACT

In a document processing method and apparatus, having both a communication function and a data processing function, when the communication function is performed during execution of the data processing function, data of the interrupted data processing, which had been stored in a first memory means, is saved in a second memory means pending completion of the communication. When performance of the communication function has ended, a restoring means restores to the first memory means the data so saved. Thus, the first memory means is used both for the communication function and the data processing function.

10 Claims, 44 Drawing Sheets

LD_TEXTD I_ ; TX_TR

LD_TEXTD I_ ; TXN_TR

LD_TEXT_ ; TXN_TR

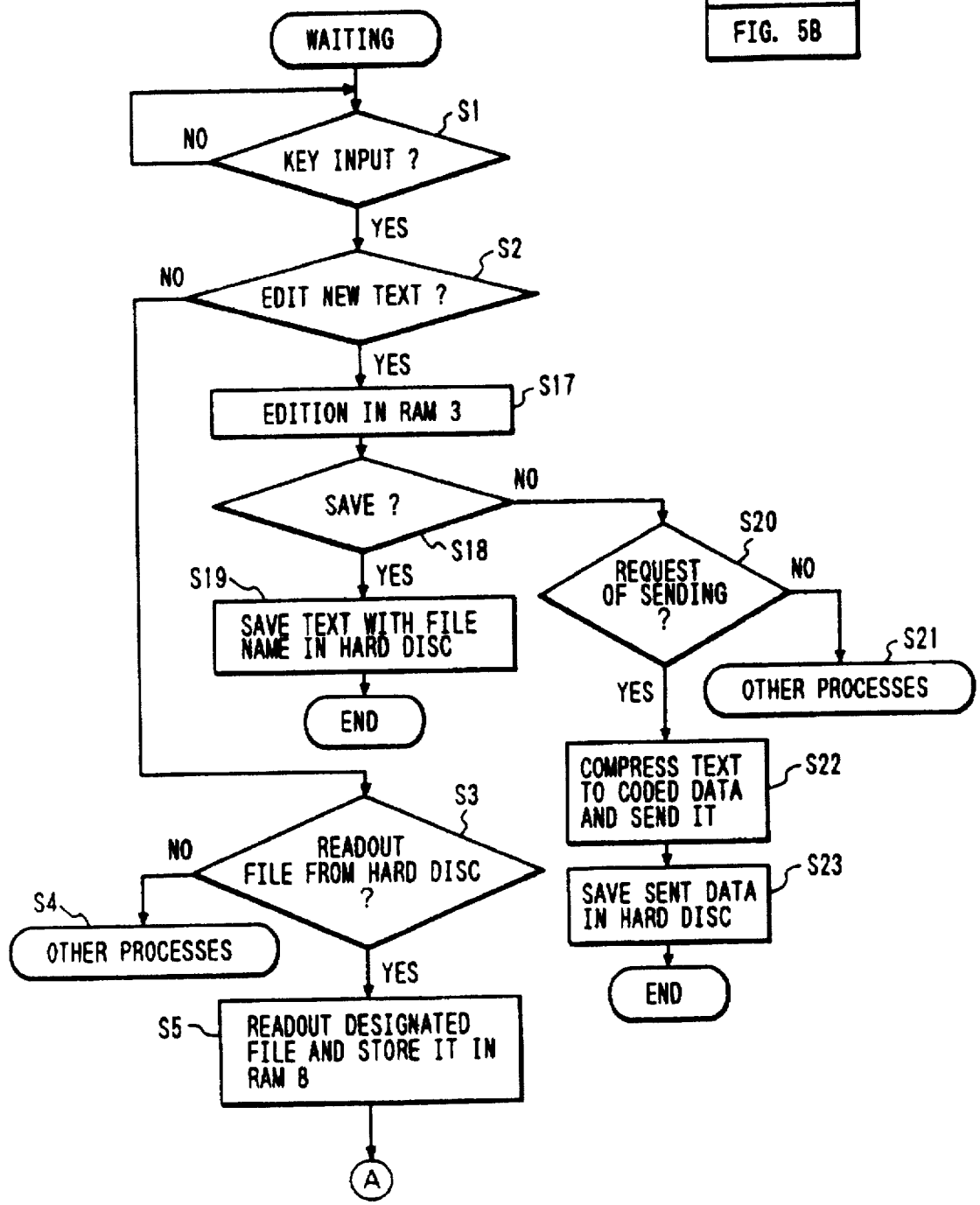

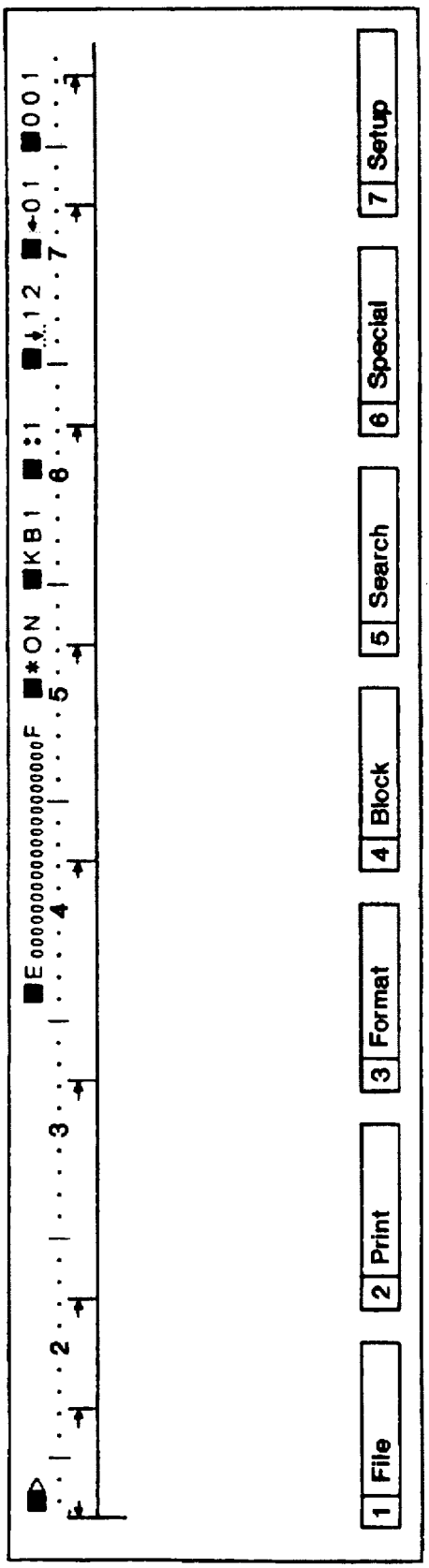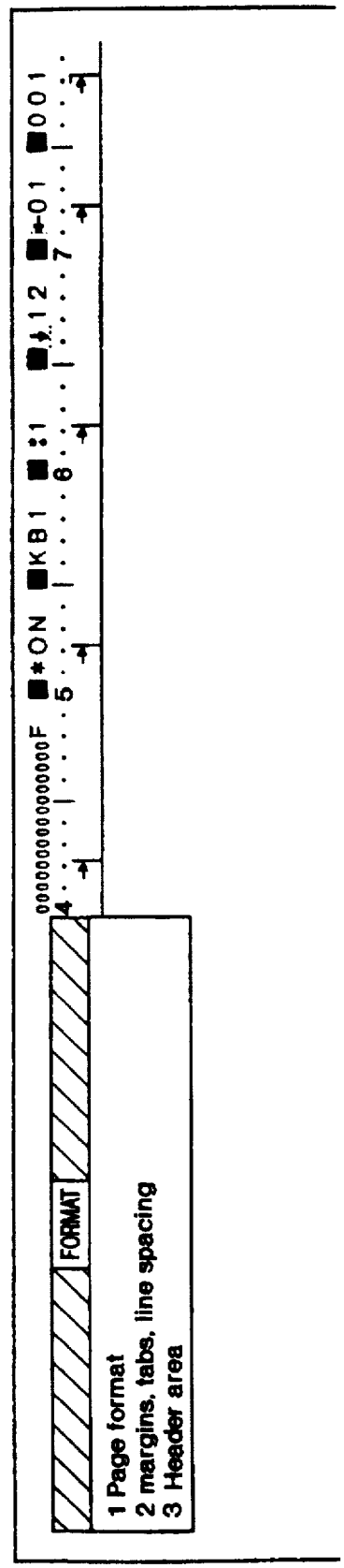

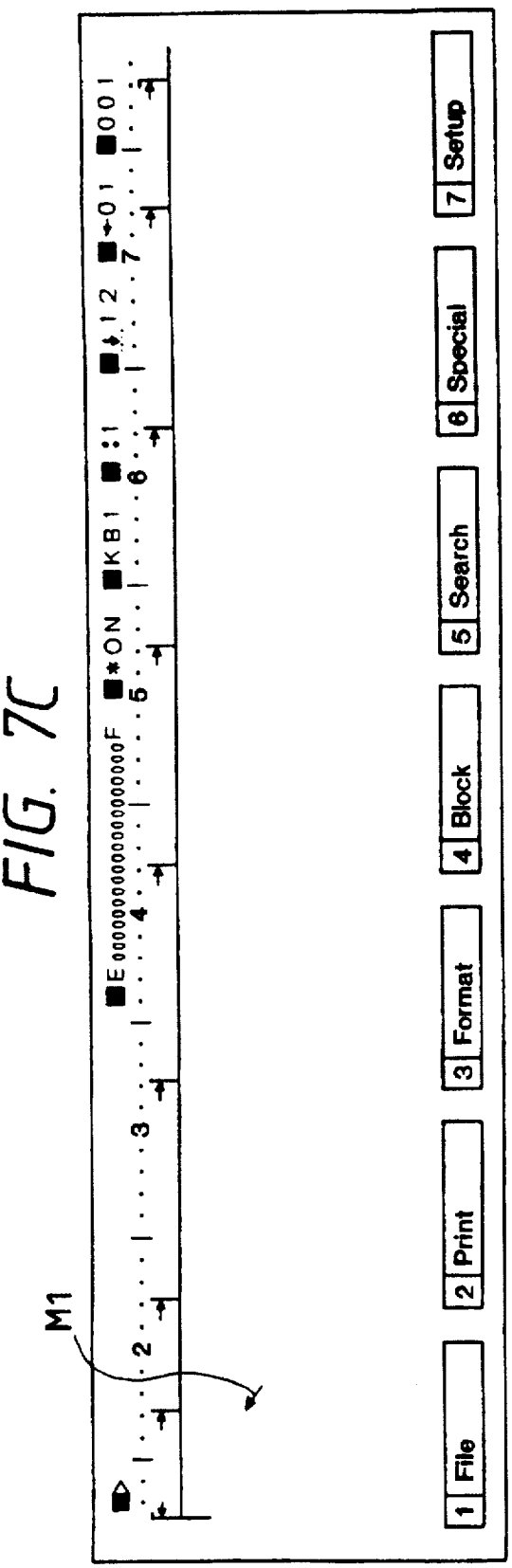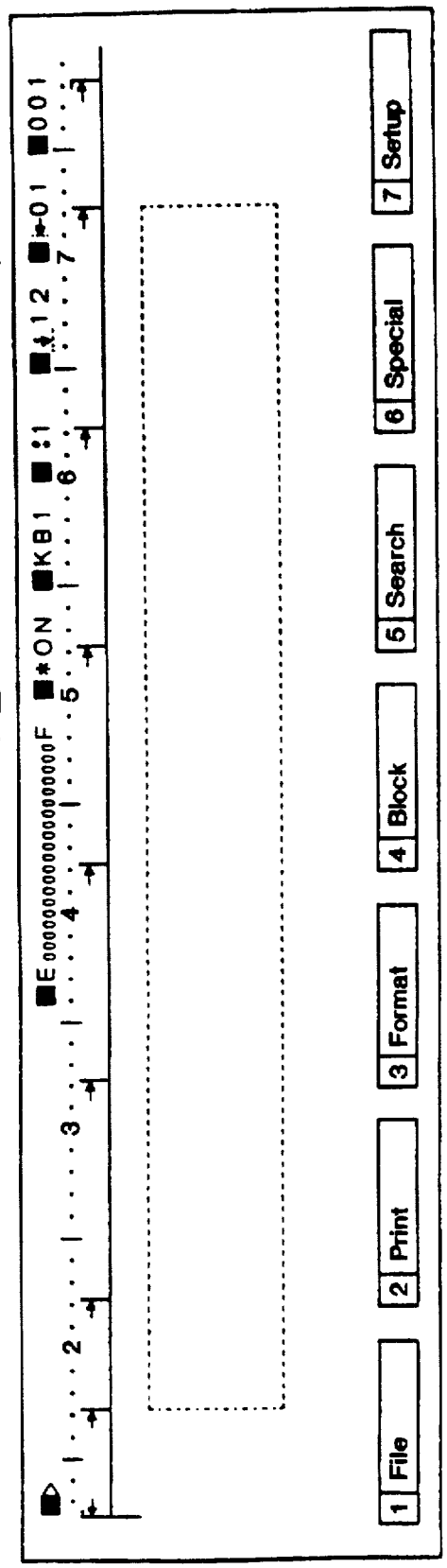

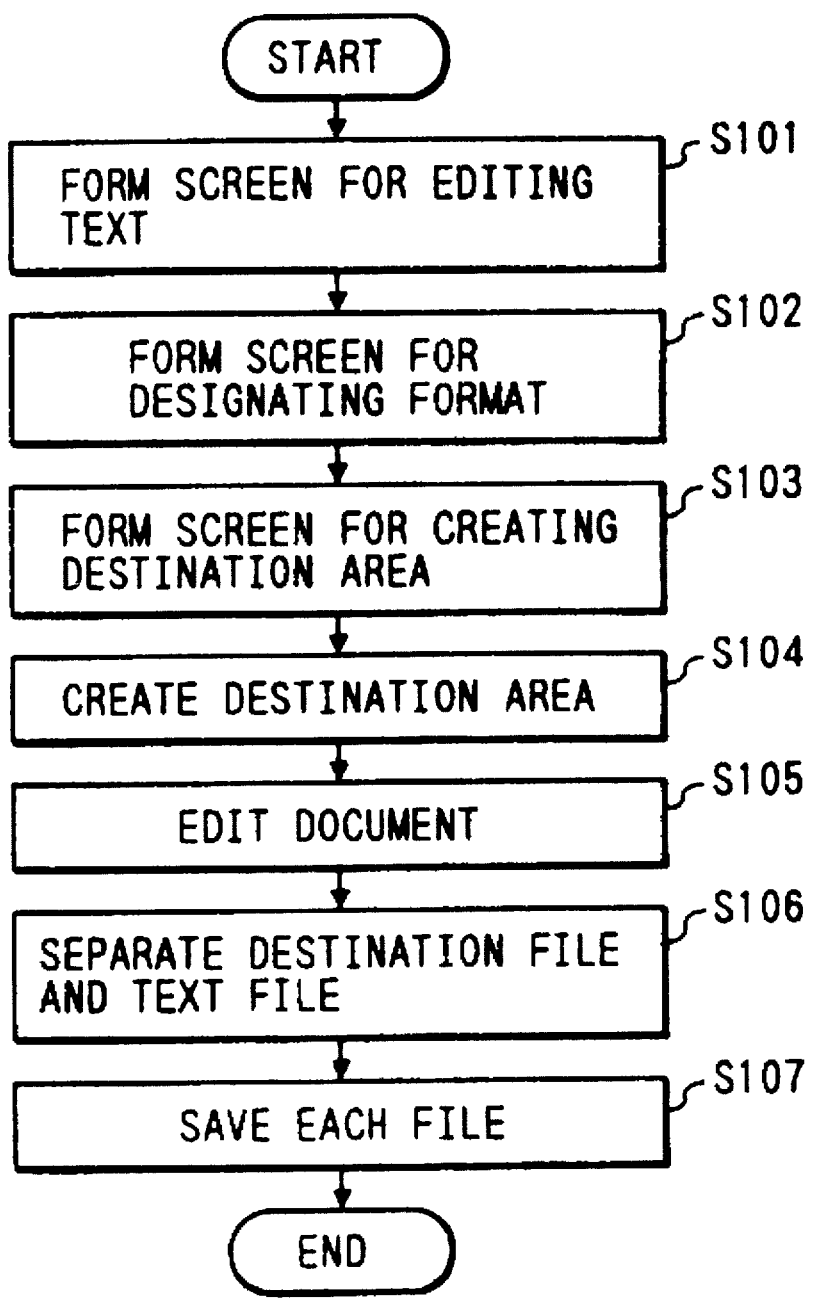

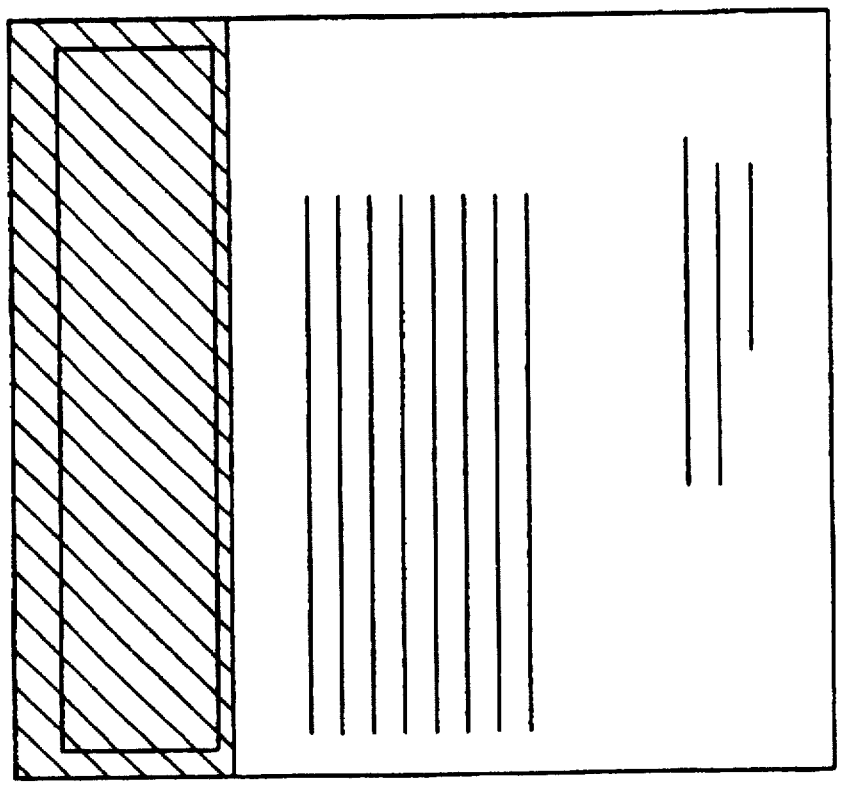
FIG. 9
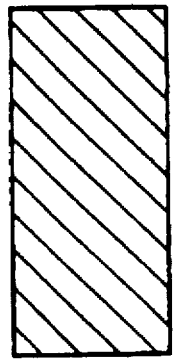
: 1st FILE
: 2nd FILE
OTHER

FIG. 10

```
■E oooooooooooooooooF  ■*ON  ■KB1  ■:1  ■↓12  ■↲01  ■001
|....1....|....2....|....3....|....4....|....5....|....6....|....7....|
```

DIAL LIST

| NO. | Name | Company | Phone # |
|-----|------|---------|---------|
| 1 | Paul Mac | Wingers | 012 456 7890 |
| 2 | Paul Rogers | Bad-Company | 456 789 0123 |

| 1 File | 2 Print | 3 Format | 4 Block | 5 Search | 6 Special | 7 Setup |

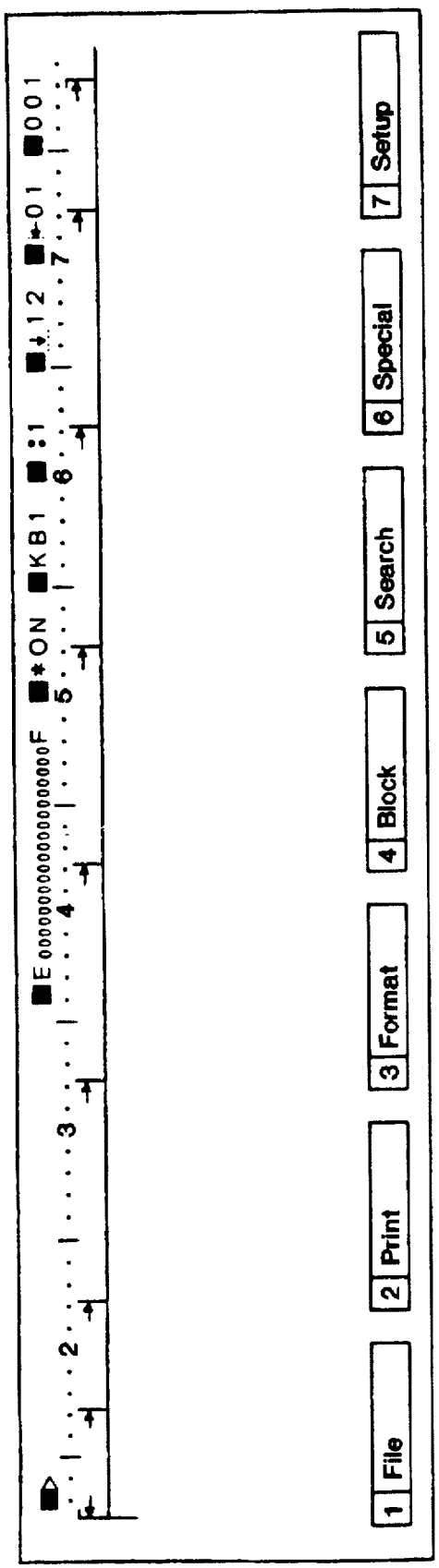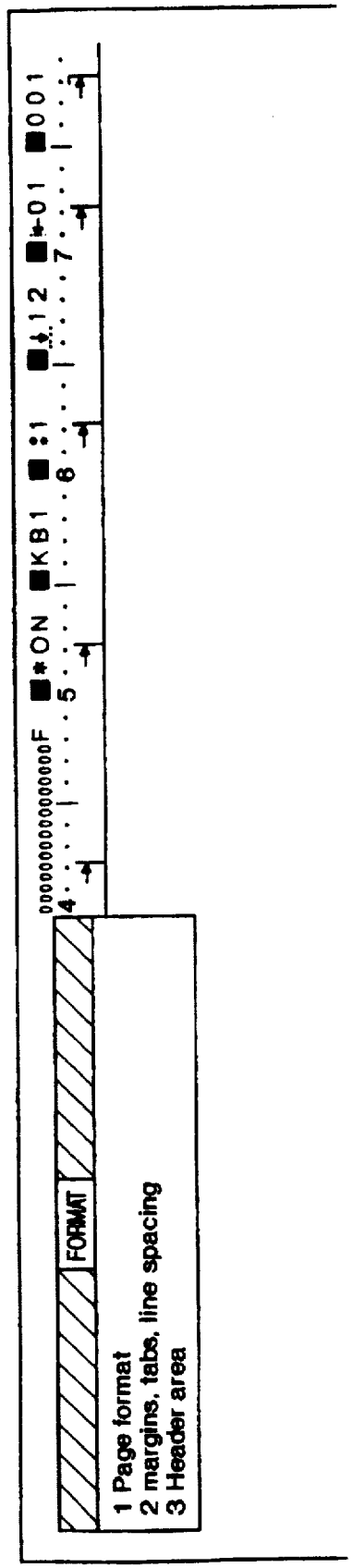
FIG. 12A
FIG. 12B

| | D0 | D1 | D2 | D3 | D4 | D5 | D6 | D7 |
|---|---|---|---|---|---|---|---|---|
| FIG. 23A | FIRST | HMEMAV | HATout | / | / | / | / | / |
| FIG. 23B | HTBSY | HRBSY | HMBSY | HATin | / | / | / | / |
| FIG. 23C | / | SMEMAV | SATout | / | / | / | / | / |
| FIG. 23D | STBSY | SRBSY | SMBSY | SATin | / | / | / | / |

FIG. 26

| ADDRESS | D7 | D6 | D5 | D4 | D3 | D2 | D1 | D0 |
|---|---|---|---|---|---|---|---|---|
| 000H | 1 | 2 | 3 | 4 | 5 | 6 | 7 | 8 |
| 001H | 9 | 10 | 11 | 12 | 13 | 14 | 15 | 16 |
| 002H | 17 | 18 | 19 | 20 | 21 | 22 | 23 | 24 |
| 003H | 25 | 26 | 27 | 28 | 29 | 30 | 31 | 32 |
| 004H | 33 | 34 | 35 | 36 | 37 | 38 | 39 | 40 |
| 005H | 41 | 42 | 43 | 44 | 45 | 46 | 47 | 48 |
| 006H | 49 | 50 | 51 | 52 | 53 | 54 | 55 | 56 |
| 007H | 57 | 58 | 59 | 60 | 61 | 62 | 63 | 64 |
| 008H | 65 | 66 | 67 | 68 | 69 | 70 | 71 | 72 |
| ⋮ | | | | | | | | |
| 0014H | 161 | 162 | 163 | 164 | 165 | 166 | 167 | 168 |
| 0015H | 169 | 170 | 171 | 172 | 173 | 174 | 175 | 176 |

| ADDRESS | D7 | D6 | D5 | D4 | D3 | D2 | D1 | D0 |
|---|---|---|---|---|---|---|---|---|
| 0100H | 1 | 2 | 2 | 3 | 4 | 4 | 5 | 6 |
| 0101H | 6 | 7 | 8 | 8 | 9 | 10 | 10 | 11 |
| 0102H | 12 | 12 | 13 | 14 | 14 | 15 | 16 | 16 |
| 0103H | 17 | 18 | 18 | 19 | 20 | 20 | 21 | 22 |
| 0104H | 22 | 23 | 24 | 24 | 25 | 26 | 26 | 27 |
| 0105H | 28 | 28 | 29 | 30 | 30 | 31 | 32 | 32 |
| 0106H | 33 | 34 | 34 | 35 | 36 | 36 | 37 | 38 |
| 0107H | 38 | 39 | 40 | 40 | 41 | 42 | 42 | 43 |
| 011EH | 161 | 162 | 162 | 163 | 164 | 164 | 165 | 166 |
| 011FH | 166 | 167 | 168 | 168 | 169 | 170 | 170 | 171 |
| 0120H | 172 | 172 | 173 | 174 | 174 | 175 | 176 | 176 |

| ADDRESS | D7 | D6 | D5 | D4 | D3 | D2 | D1 | D0 |
|---------|----|----|----|----|----|----|----|----|
| 0200H | 1 | 17 | 33 | 49 | 65 | 81 | 97 | 113 |
| 0201H | 129 | 145 | 161 | × | × | × | × | × |
| 0202H | 2 | 18 | 34 | 50 | 66 | 82 | 98 | 114 |
| 0203H | 130 | 146 | 162 | × | × | × | × | × |
| 0204H | 3 | 19 | 35 | 51 | 67 | 83 | 99 | 115 |
| 0205H | 131 | 147 | 163 | × | × | × | × | × |
| 0206H | 4 | 20 | 36 | 52 | 68 | 84 | 100 | 116 |
| 0207H | 132 | 148 | 164 | × | × | × | × | × |
| ⋮ | | | | | | | | |
| 022DH | 143 | 159 | 175 | × | × | × | × | × |
| 022EH | 16 | 32 | 48 | 64 | 80 | 96 | 112 | 128 |
| 022FH | 144 | 160 | 176 | × | × | × | × | × |

| ADDRESS | D7 | D6 | D5 | D4 | D3 | D2 | D1 | D0 |
|---------|----|----|----|----|----|----|----|----|
| 0200H | 1 | 17 | 17 | 33 | 49 | 49 | 65 | 81 |
| 0201H | 81 | 97 | 113 | 113 | 129 | 145 | 145 | 161 |
| 0202H | 2 | 18 | 18 | 34 | 50 | 50 | 66 | 82 |
| 0203H | 82 | 98 | 114 | 114 | 130 | 146 | 146 | 162 |
| 0204H | 3 | 19 | 19 | 35 | 51 | 51 | 67 | 83 |
| 0205H | 83 | 99 | 115 | 115 | 131 | 147 | 147 | 163 |
| 0206H | 4 | 20 | 20 | 36 | 52 | 52 | 68 | 84 |
| 0207H | 84 | 100 | 116 | 116 | 132 | 148 | 148 | 164 |
| 022DH | 95 | 111 | 127 | 127 | 143 | 159 | 159 | 175 |
| 022EH | 16 | 32 | 32 | 48 | 64 | 64 | 80 | 96 |
| 022FH | 96 | 112 | 128 | 128 | 144 | 160 | 160 | 176 |

| ADDRESS | D7 | D6 | D5 | D4 | D3 | D2 | D1 | D0 |
|---------|----|----|----|----|----|----|----|-----|
| 0300H | 1 | 2 | 2 | 3 | 4 | 4 | 5 | 6 |
| 0301H | 6 | 7 | 8 | 8 | 9 | 10 | 10 | 11 |
| 0302H | 12 | 12 | 13 | 14 | 14 | 15 | 16 | 16 |
| 0303H | 17 | 18 | 18 | 19 | 20 | 20 | 21 | 22 |
| 0304H | 22 | 23 | 24 | 24 | 25 | 26 | 26 | 27 |
| 0305H | 28 | 28 | 29 | 30 | 30 | 31 | 32 | 32 |
| 0306H | 17 | 18 | 18 | 19 | 20 | 20 | 21 | 22 |
| 0307H | 22 | 23 | 24 | 24 | 25 | 26 | 26 | 27 |
| ⋮ | | | | | | | | |
| 032DH | 161 | 162 | 162 | 163 | 164 | 164 | 165 | 166 |
| 032EH | 166 | 167 | 168 | 168 | 169 | 170 | 170 | 171 |
| 032FH | 172 | 172 | 173 | 174 | 174 | 175 | 176 | 176 |

| ADDRESS | D7 | D6 | D5 | D4 | D3 | D2 | D1 | D0 |
|---|---|---|---|---|---|---|---|---|
| 0000H | 1 | 2 | 3 | 4 | 5 | 6 | 7 | 8 |
| 0001H | 9 | 10 | 11 | × | × | × | × | × |
| 0002H | 12 | 13 | 14 | 15 | 16 | 17 | 18 | 19 |
| 0003H | 20 | 21 | 22 | × | × | × | × | × |
| 0004H | 23 | 24 | 25 | 26 | 27 | 28 | 29 | 30 |
| 0005H | 31 | 32 | 33 | × | × | × | × | × |
| 0006H | 34 | 35 | 36 | 37 | 38 | 39 | 40 | 41 |
| 0007H | 42 | 43 | 44 | × | × | × | × | × |
| ... | | | | | | | | |
| 001EH | 166 | 167 | 168 | 169 | 170 | 171 | 172 | 173 |
| 001FH | 174 | 175 | 176 | × | × | × | × | × |

| ADDRESS | D7 | D6 | D5 | D4 | D3 | D2 | D1 | D0 |
|---|---|---|---|---|---|---|---|---|
| 0000H | 1 | 2 | 2 | 3 | 4 | 4 | 5 | 6 |
| 0001H | 6 | 7 | 8 | 8 | 9 | 10 | 10 | 11 |
| 0002H | 12 | 13 | 13 | 14 | 15 | 15 | 16 | 17 |
| 0003H | 17 | 18 | 19 | 19 | 20 | 21 | 21 | 22 |
| 0004H | 23 | 24 | 24 | 25 | 26 | 26 | 27 | 28 |
| 0005H | 28 | 29 | 30 | 30 | 31 | 32 | 32 | 33 |
| 0006H | 34 | 35 | 35 | 36 | 37 | 37 | 38 | 39 |
| 0007H | 39 | 40 | 41 | 41 | 42 | 43 | 43 | 44 |
| ⋮ | | | | | | | | |
| 001EH | 166 | 167 | 167 | 168 | 169 | 169 | 170 | 171 |
| 001FH | 171 | 172 | 173 | 173 | 174 | 175 | 175 | 176 |

| ADDRESS | D7 | D6 | D5 | D4 | D3 | D2 | D1 | D0 |
|---|---|---|---|---|---|---|---|---|
| 0100H | 1 | 12 | 23 | 34 | 45 | 56 | 67 | 78 |
| 0101H | 89 | 100 | 111 | 122 | 133 | 144 | 155 | 166 |
| 0102H | 2 | 13 | 24 | 35 | 46 | 57 | 68 | 79 |
| 0103H | 90 | 101 | 112 | 123 | 134 | 145 | 156 | 167 |
| 0104H | 2 | 13 | 24 | 35 | 46 | 57 | 68 | 79 |
| 0105H | 90 | 101 | 112 | 123 | 134 | 145 | 156 | 167 |
| 0106H | 3 | 14 | 25 | 36 | 47 | 58 | 69 | 80 |
| 0107H | 91 | 102 | 113 | 124 | 135 | 146 | 157 | 168 |
| 011EH | 11 | 22 | 33 | 44 | 55 | 66 | 77 | 88 |
| 011FH | 99 | 110 | 121 | 132 | 143 | 154 | 165 | 176 |

| ADDRESS | D7 | D6 | D5 | D4 | D3 | D2 | D1 | D0 |
|---|---|---|---|---|---|---|---|---|
| 0200H | 1 | 12 | 12 | 23 | 34 | 34 | 45 | 56 |
| 0201H | 56 | 67 | 78 | 78 | 89 | 100 | 100 | 111 |
| 0202H | 122 | 122 | 133 | 144 | 144 | 155 | 166 | 166 |
| 0203H | 2 | 13 | 13 | 24 | 35 | 35 | 46 | 57 |
| 0204H | 57 | 68 | 79 | 79 | 90 | 101 | 101 | 112 |
| 0205H | 123 | 123 | 134 | 145 | 145 | 156 | 167 | 167 |
| 0206H | 2 | 13 | 13 | 24 | 35 | 35 | 46 | 57 |
| 0207H | 57 | 68 | 79 | 79 | 90 | 101 | 101 | 112 |
| ⋮ | | | | | | | | |
| 022DH | 11 | 22 | 22 | 33 | 44 | 44 | 55 | 66 |
| 022EH | 66 | 77 | 88 | 88 | 99 | 110 | 110 | 121 |
| 022FH | 132 | 132 | 143 | 154 | 154 | 165 | 176 | 176 |

| ADDRESS | D7 | D6 | D5 | D4 | D3 | D2 | D1 | D0 |
|---------|----|----|----|----|----|----|----|-----|
| 0300H | 1 | 2 | 2 | 3 | 4 | 4 | 5 | 6 |
| 0301H | 6 | 7 | 8 | 8 | 9 | 10 | 10 | 11 |
| 0302H | 12 | 12 | 13 | 14 | 14 | 15 | 16 | 16 |
| 0303H | 17 | 18 | 18 | 19 | 20 | 20 | 21 | 22 |
| 0304H | 22 | 23 | 24 | 24 | 25 | 26 | 26 | 27 |
| 0305H | 28 | 28 | 29 | 30 | 30 | 31 | 32 | 32 |
| 0306H | 17 | 18 | 18 | 19 | 20 | 20 | 21 | 22 |
| 0307H | 22 | 23 | 24 | 24 | 25 | 26 | 26 | 27 |
| ⋮ | | | | | | | | |
| 032DH | 161 | 162 | 162 | 163 | 164 | 164 | 165 | 166 |
| 032EH | 166 | 167 | 168 | 168 | 169 | 170 | 170 | 171 |
| 032FH | 172 | 172 | 173 | 174 | 174 | 175 | 176 | 176 |

513

DOCUMENT PROCESSING APPARATUS HAVING A COMMUNICATION/FACSIMILE FUNCTION WITH SELECTIVE MEMORY SWITCHING

This application is a division of application Ser. No. 07/863,450, filed Apr. 3, 1992.

BACKGROUND OF THE INVENTION

1. Field of the Invention

The present invention relates to a document processing apparatus having a communication function.

2. Related Background Art

Conventionally, for example, a document processing apparatus with a facsimile function, which can create and edit a document using character code data, and can perform a facsimile sending operation by converting the character code data into image data, is provided.

A document processing apparatus of this type sends document data stored in an external memory device such as a floppy disk, a hard disk, or the like, or document data stored in an internal memory such as a RAM. More specifically, in the document processing apparatus, in terms of the data processing time, the communication speed, and the like upon execution of a sending operation, after a document to be sent is converted from code data into image data in advance, the image data is compressed by a method regulated by, e.g., the G3 mode of the CCITT, and the compressed data is temporarily stored in, e.g., a floppy disk. Thereafter, the sending operation is started.

In a document processing apparatus of this type, data which is sent already is deleted after a sending operation, and only document data which is not sent yet is left, so that the maximum amount reception data can be stored.

However, when sent data is not saved, if an operator wants to partially modify the sent data to create a new document, since the original document is not saved, he or she must create a document from the beginning.

Similarly, when a document already saved in a floppy disk is read out, and is sent after it is partially modified, if the modified document is not saved, the original document must be modified again when necessary.

On the other hand, when sending data is stored in a floppy disk without limitations-, a large-capacity device is required, resulting in an increase in cost.

Therefore, in order to properly manage sent documents, an operator must decide whether or not a document should be saved every time he or she sends the document.

In a document processing apparatus of this type, when a document is created and sent, a mode for attaching a cover page is normally designated before a sending operation. In this case, a predetermined form of a cover page corresponding to a type of each apparatus is prepared and sent with the document. If a desired form is not prepared, destination data is input in a document text, and the document text including the cover page is sent.

However, the above-mentioned apparatus suffers from the following drawbacks:

(1) Even when a memo is sent, the cover page must be attached. When the memo is sent to a plurality of destinations, the cover page is also sent to these destinations.

(2) When a document having the same content is sent to a plurality of destinations like in a multi-address communication mode, if no cover page is attached, a plurality of destination data must be input in a document.

Conventionally, a special-purpose facsimile apparatus is known, and has a special-purpose data storage area for performing a facsimile sending/reception operation. Recently, electronic apparatuses such as personal computers, wordprocessors, and the like having a facsimile function are commercially available. These apparatuses generally have both external and internal memory devices, and are designed to have a considerably large memory capacity. In addition, these apparatuses use a CPU, which can perform high-speed processing. However, some apparatuses cannot assure a memory capacity, and do not perform a facsimile function service during creation of a document.

In the above-mentioned prior art, an electronic apparatus, which can always support a facsimile function, requires a large memory capacity, and also requires a CPU, which can perform high-speed processing, and has high-grade functions, resulting in an increase in cost.

Therefore, when a facsimile function is added to a compact electronic apparatus, a facsimile reception operation cannot be performed during processing of a document, and can be performed in only a waiting state. In addition, a reception mode must be requested in advance through a telephone communication.

When an electronic apparatus having a facsimile function is of a separation type, that is, the facsimile function is added by an optional unit, the optional unit is connected to a bus expansion port in the same manner as a versatile RS232C serial interface of a document processing apparatus, or an expansion I/O board of a personal computer, or to a printer port. When the electronic apparatus is of a built-in type, a special-purpose microprocessor for a facsimile function is arranged, and document processing and facsimile control are independently performed by special-purpose microprocessors. Each microcomputer system is provided with peripheral circuits, a ROM for storing programs, various tables, a data processing RAM, and the like.

However, in the above-mentioned prior art, from the viewpoints of facsimile image processing (dot density processing), the facsimile function is normally executed in a dot density of about 200 dpi (8 pel/mm in the horizontal direction; 3.85 dots/mm in the vertical direction) in-the G3 mode of the CCITT standards, while the document processing microcomputer system normally has character generation (CG) ROM data such as fonts corresponding to 200 dpi for data transmission. There are cases wherein the dot density of the ROM data coincides with that of a printer or a display, and cases wherein they do not coincide. For example, when a high-resolution printer is used, the microcomputer system has many font data such as printer CG font data, display CG font data, and the like.

From the viewpoints of data strings, facsimile data are data strings in the horizontal direction, while those of a wire-dot or thermal printer are data strings in the vertical direction. Therefore, in the prior art, conversion of data strings is required. Furthermore, as for the dot density, when an apparatus cannot have many CGs, dot density conversion for forming font data having a facsimile dot density from a single CG is also required. The document processing microcomputer system and the facsimile microcomputer system share these processing operations. In general, since the facsimile microcomputer system mainly performs communication control such as facsimile data compression, modem processing, and the like, the document processing microprocessor system performs other processing operations such as dot density conversion, data string conversion, and the like. For this reason, an extra memory is arranged independently of the systems, or a very long program processing time is required for the above-mentioned processing.

Even in the separation type apparatus to which the facsimile function can be added, the above-mentioned loads are imposed on the document processing system side.

In an apparatus such as a facsimile apparatus, an image reader, or the like, for photoelectrically reading an original image, converting the read image data into digital dot image data, and outputting the converted data, image data read at a resolution (dot density) of, e.g., 200 dpi (dots/inch) is printed by a printer having the same resolution of 200 dpi. When 200-dpi image data is printed using a 400-dpi printer, the 200-dpi image data is easily converted into image data having a dot density of 400 dpi by software processing, and the converted data is printed. However, when resolution conversion is not relatively easy, for example, when image data having a dot density of 180 dpi is printed by a 200-dpi printer, complex calculations are required for causing the dot density of the image data to coincide with that of the printer. For this reason, the 180-dpi image data is directly printed by the 200-dpi printer without changing the dot density.

However, when image data is printed by a printer having a resolution different from the dot density of image data without performing dot-density conversion, a printed image size becomes different from an actual image size. In order to remove such a drawback, an output apparatus such as a printer having the same resolution as that of read image data must be equipped. However, it is not practical to equip all the printers having the same resolutions as those of image data. Therefore, processing for converting the dot density of image data is necessary. When dots are added or deleted by, e.g., software processing to perform dot-density conversion, the overall processing speed is undesirably decreased.

SUMMARY OF THE INVENTION

It is an object of the present invention to improve a document processing apparatus in consideration of the above-mentioned problems.

It is another object of the present invention to provide a document processing apparatus, which can properly save a sent document without troubling an operator, and can reduce the capacity of an auxiliary memory device as much as possible.

It is still another object of the present invention to provide a document processing apparatus, which separately manages cover page information such as destination data, and a text document, thus facilitating a setting operation of a destination document.

It is still another object of the present invention to provide a document processing apparatus, which can perform data communication even during document processing with a simple arrangement.

It is still another object of the present invention to provide a document processing apparatus, which has a communication function and a document processing function independent of each other, and can reduce the load imposed on document processing when conversion of the dot density or data string is performed.

It is still another object of the present invention to provide an apparatus, which performs dot-density conversion of image data with a simple arrangement.

Other objects of the present invention will become apparent from the following description of the embodiments taken in conjunction with the accompanying drawings.

BRIEF DESCRIPTION OF THE DRAWINGS

FIGS. 7A to 7D are views for explaining a transition in image display according to the second embodiment;

FIG. 8 is a flow chart showing the operation of a CPU 21 in correspondence with FIGS. 7A to 7D;

FIG. 9 is a view showing a text edition screen according to the second embodiment;

FIG. 10 is a view showing a display example of a dial list stored in a RAM 23 shown in FIG. 6;

FIGS. 12A to 12D are views showing a transition in image display according to the third embodiment;

FIGS. 23A to 23D are views for explaining the contents of a command buffer according to the seventh embodiment;

FIG. 26 is a view showing a storage state of dot data before conversion stored in the RAM;

FIG. 28 is a view showing a storage state of dot data stored in the RAM after dot-density conversion in the x-direction;

FIG. 30 is a view showing a storage state of dot data stored in the RAM after vertical/horizontal conversion;

FIG. 31 is a view showing a state wherein dot data shown in FIG. 30 is expanded in the x-direction, and the expanded data is stored in a memory;

FIG. 32 is a view showing a state wherein data shown in FIG. 31 is restored by vertical/horizontal conversion, and the converted data is stored in a memory;

FIG. 36 is a view showing a storage data of the dot data shown in FIG. 35 in a memory;

FIG. 37 is a view showing a state wherein the data shown in FIG. 36 is expanded in the x-direction;

FIG. 38 is a view showing a storage state of a memory after vertical/horizontal conversion of the image data shown in FIG. 37 is performed;

FIG. 39 is a view showing a state wherein the data shown in FIG. 38 is re-converted by the converter circuit shown in FIG. 27, and the converted data is stored in a memory;

FIG. 41 is a view showing a state of dot data stored in a RAM after dot-density conversion in the y-direction;

DETAILED DESCRIPTION OF THE PREFERRED EMBODIMENTS

The preferred embodiments of the present invention will be described in detail below with reference to the accompanying drawings.

Figure 1:
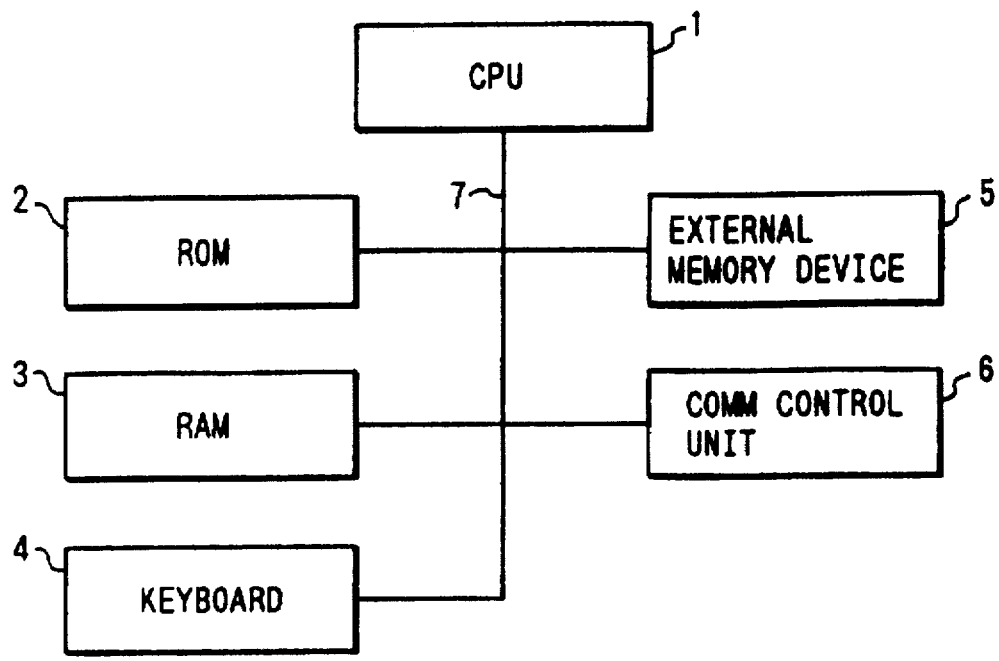
FIG. 1 is a block diagram showing the arrangement of a document processing apparatus according to the first embodiment of the present invention.

FIG. 1 is a block diagram showing the arrangement of a document processing apparatus according to the first embodiment of the present invention.

The document processing apparatus has a microcomputer (CPU) 1 for controlling the overall apparatus, a ROM 2 for storing programs for document processing, facsimile processing, and the like, character generation (CG) data, and the like, and a RAM 3 for providing a work area necessary for the document processing, facsimile processing, and a normal operation of the CPU 1.

The document processing apparatus also has a keyboard 4 for inputting various data, a floppy disk driver (external memory device) 5 as an auxiliary memory device, a communication control unit 6 connected to analog circuits such as a modem, NCU, and the like, and a bus 7 for connecting the CPU 1 and the respective components.

Figure 2:
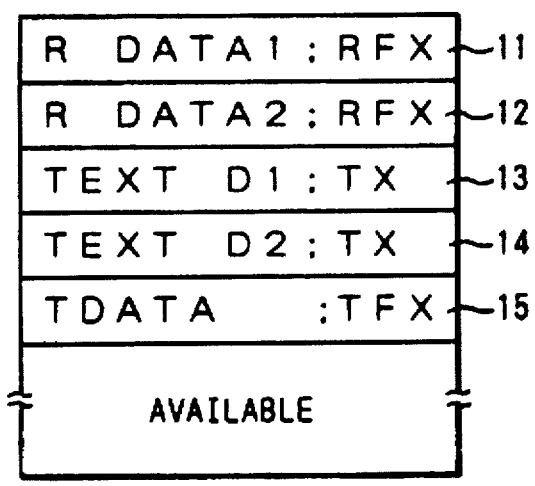
FIG. 2 is a view showing some of data to be stored in a disk memory of the first embodiment.

FIG. 2 is a view showing some of data stored in a floppy disk in this embodiment.

In FIG. 2, the floppy disk stores five files 11 to 15. The file 11 has a file name "RDATA1;RFX" indicating a file of received data, and the file 12 has a file name "RDATA2;RFX" indicating another file of received data.

The file 13 has a file name "TEXTD1;TX" indicating that a document file is created and stored, and the file 14 has a file name "TEXTD2;TX" indicating that another document file is created and stored.

Furthermore, the file 15 is a sent facsimile file. In this case, "TFX" in the file name indicates that a sending operation has already been performed. When a file is not sent due to any problem on a line such as a sending error, a file is stored to have "FX".

Note that an area after the file 15 is available.

Figures 3A, 3B, 3C, 4:
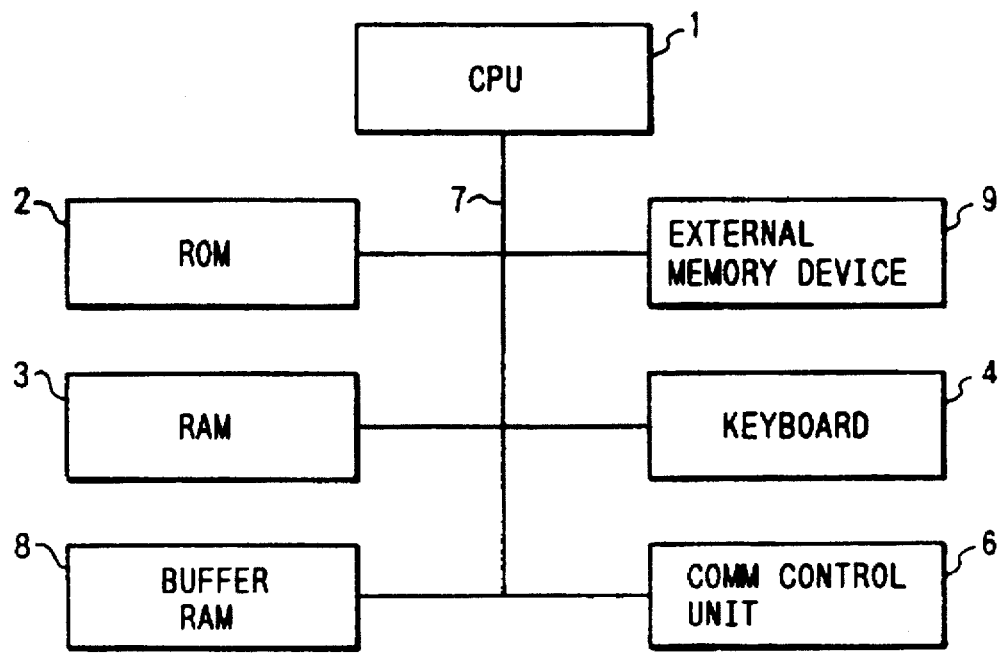
FIGS. 3A to 3C are views showing key operations.
FIG. 4 is a block diagram showing another arrangement of the first embodiment.

When an operator reads out the file 13 having the file name "TEXTD1;TX" from the floppy disk, and sends the readout file by operating the keyboard 4, he or she performs key inputs shown in FIG. 3A. In FIG. 3A, "_" indicates an input of a space key. When the key inputs are made, as-shown in FIG. 3A, it can be determined based on the key input "TX" that the content of the file is sent without being rewritten. Thus, sent compression data is left without being saved, and "TDATA;TFX" in the sent file is left without being deleted.

When an operator reads out the file having the file name "TEXTD1;TX" from the floppy disk, changes its content, and sends the changed content, he or she performs key inputs shown in FIG. 3B. Of these key inputs, it can be determined based on the input "TXN" that the content is rewritten. In this case, when sending compression data is formed, the existing file having the file name "TDATA;TFX" is deleted, and the content of a new sending file "TEXTD1;TXN" formed by compression coding is stored to have the same file name.

When an operator wants to send a document in the RAM 3, he or she makes key inputs shown in FIG. 3C. In the same manner as in the case shown in FIG. 3B, upon input of "TXN", a text in the RAM 3 is compressed and sent, and is then saved as the content of "TDATA;TFX" after the previous content is deleted.

FIG. 4 is a block diagram showing another arrangement.

This document processing apparatus has a 20-MB hard disk driver 9 as the auxiliary memory device, and a buffer RAM 8 for temporarily storing a document file read out from the hard disk. Since other arrangements are the same as those of the first embodiment, the same reference numerals denote the same parts as in the first embodiment, and a detailed description thereof will be omitted.

Figure 5B:
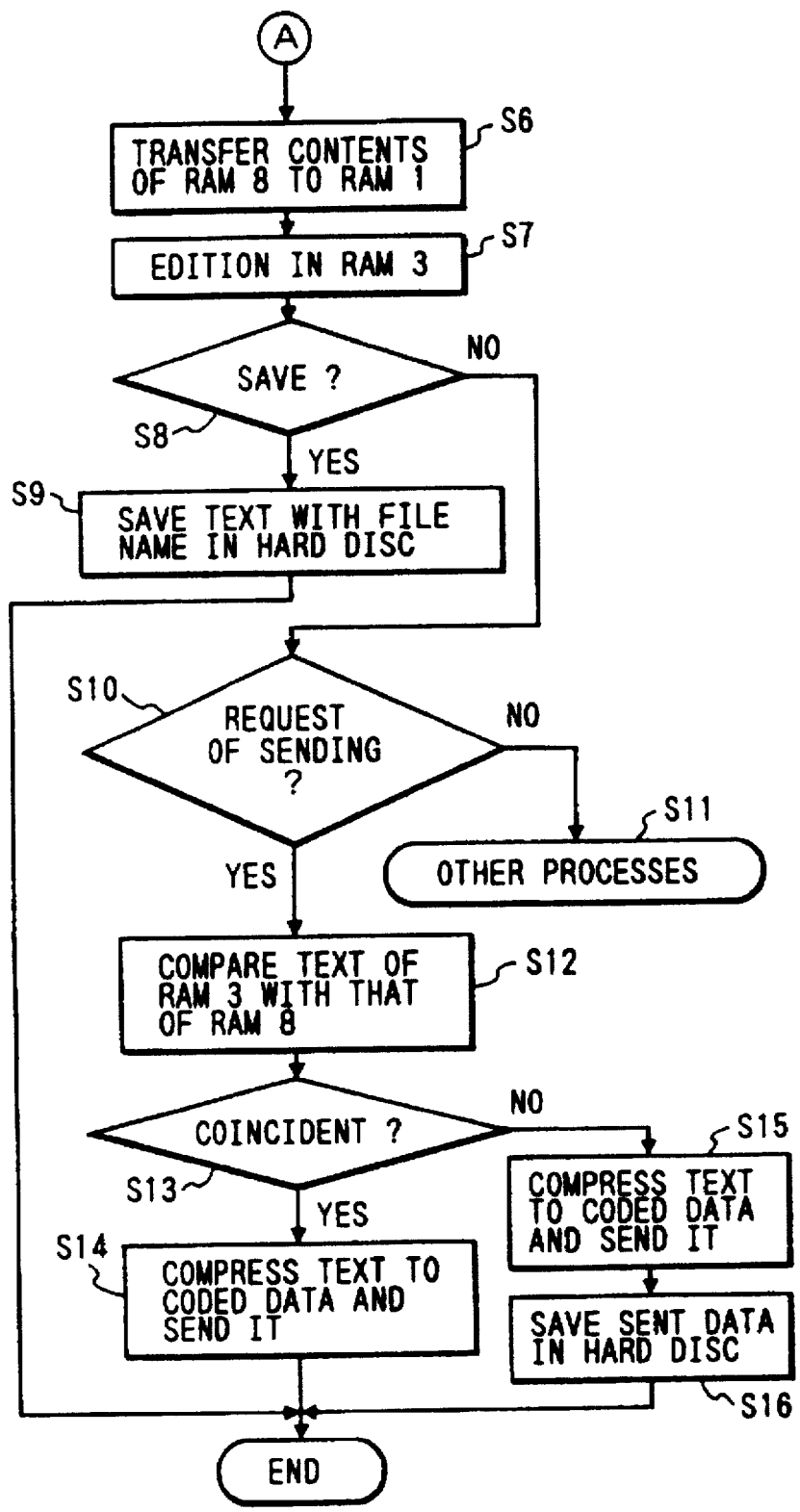
FIG. 5 is a flow chart showing a control operation of the first embodiment.

FIG. 5 is a flow chart showing the operation of the first embodiment.

If it is determined in a waiting state that an input operation is performed at the keyboard 4 (S1), it is checked if a command for editing a new text is input (S2). If NO in step S2, it is checked if a command for reading out a document file in the hard disk is input (S3). If NO in step S3, other designated processes are executed (S4).

If it is determined in step S3 that the command for reading out a document file in the hard disk is input, the designated document file is read out from the hard disk, and is stored in the buffer RAM 8 (S5).

The document file is transferred from the buffer RAM 8 to a text editing area in the RAM 3 (S6). Thereafter, editing processing is started on the editing area in the RAM 3 (S7). Upon completion of this processing, it is checked if the edited file is re-saved in the hard disk (S8). If YES in step S8, a re-saving operation is performed (S9).

If NO in step S8, it is checked if a sending request is input (S10). If NO in step S10, other processes are performed (S11). If YES in step S10, the content on the editing area in the RAM 3 is compared with the content of the buffer RAM 8 (S12). If a coincidence is found between the two contents (S13), it is determined that no editing processing is performed, and since this content has already been stored in the hard disk, only a sending operation is performed (S14).

If a non-coincidence is found between the two contents in step S13, it is determined that the file is edited, and after a sending operation (S15), the sent file is saved in the hard disk 9 (S16).

The flow returns to step S2. If it is determined that the command for editing a new text is input, an editing operation is performed on the text editing area in the RAM 3 (S17). Upon completion of the editing operation, it is checked if a command for saving the edited text in the hard disk is input (S18). If YES in step S18, saving processing is performed (S19).

If NO in step S18, it is checked if a sending request is input (S20). If NO in step S20, various designated processes are executed (S21). If YES in step S20, a sending operation is performed (S22). After the sending operation is ended, the sent file is saved in the hard disk (S23).

As described above, after document data, which is created, edited or stored by the document processing apparatus, is sent in the facsimile mode, it can be properly saved without troubling an operator, and the capacity of the sub memory device can be saved as much as possible.

The second embodiment of the present invention will be described below. In this embodiment, cover page information such as destination data is managed independently of a text document.

Figure 6:
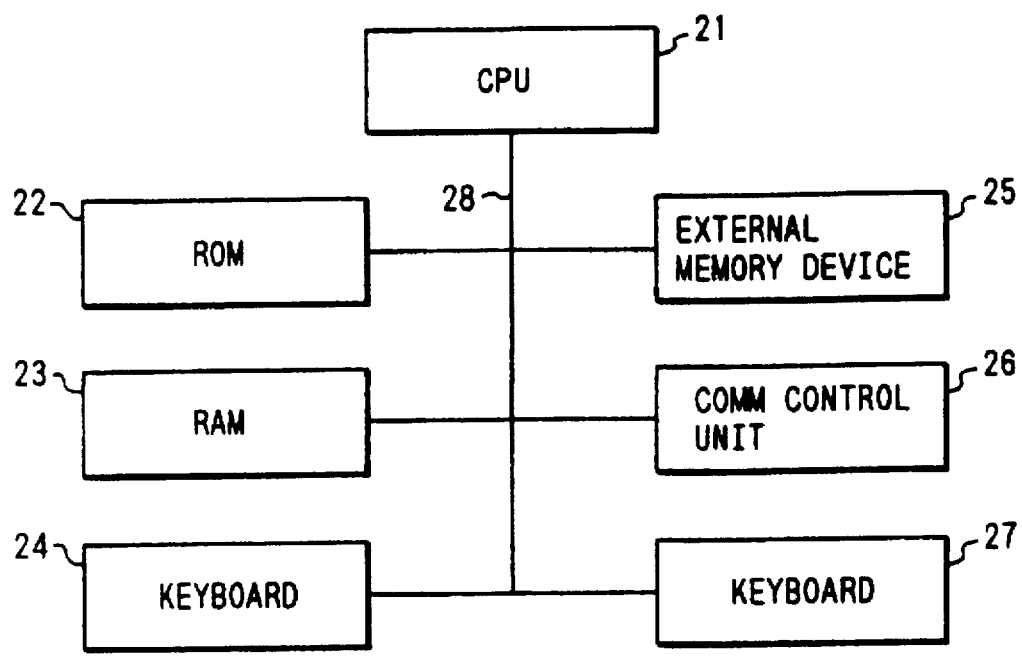
FIG. 6 is a block diagram showing the arrangement of a document processing apparatus according to the second embodiment of the present invention.

FIG. 6 is a block diagram showing the arrangement of a document processing apparatus according to the second embodiment of the present invention. In FIG. 6, the apparatus comprises a microcomputer (CPU) 21 for controlling the overall document processing apparatus, a read-only memory (to be referred to as a ROM hereinafter) 22 for storing document processing/facsimile processing programs (e.g., a program according to the flow chart shown in FIG. 8), character generation (CG) data, and the like, a random-access memory (to be referred to as a RAM hereinafter) 23 necessary for document processing/facsimile processing, and a normal operation of the CPU, and a keyboard 24 having various keys.

The apparatus also comprises an external memory device 25 such as a floppy disk drive, and a communication control unit 26 connected to an analog circuit such as a modem/NCU circuit. The apparatus further comprises an input unit 27 comprising a mouse, and a bus 28 for connecting the above-mentioned units. In a normal state, document data created on the RAM 23 by the keyboard 24 is stored in a floppy disk as the external memory device 25, or after the document data is converted into image data, the image data is compressed by a data compression coding means such as a run length method in the communication control unit 26, and the sending operation of the compressed data is performed. In this document processing apparatus, a destination area designation sequence upon creation of a sending document will be explained below.

FIGS. 7A to 7D are views for explaining a transition in image display according to the second embodiment. FIG. 8 is a flow chart for explaining the operation of the CPU 21 in correspondence with FIGS. 7A to 7D. FIG. 9 is a view showing an example of a text created according to the second embodiment. FIG. 10 is a view showing a display example of, e.g., a dial list stored in the RAM 23 in FIG. 6.

Upon operations at the keyboard, as shown in FIG. 7A, a text editing waiting state is displayed (step S101). In this state, when a "format" designation key is depressed on the keyboard 24 shown in FIG. 6, a screen for designating a format is displayed, as shown in FIG. 7B (step S102). This screen includes a mode number of "Header area (destination area)", and when the mode number "3" is designated, a display screen shown in FIG. 7C is formed prior to document text editing processing (step S103). In this state, the destination area is formed by moving an arrow M1 using the mouse of the input unit 27, as shown in FIG. 7D (step S104). The area is assured by designating the start and end points, and subsequently, document text editing processing is started (step S105). Upon completion of the text editing processing, as shown in FIG. 8, a document text is separated into a first file as the destination area, and a second file as a text document other than the destination area, as shown in FIG. 9 (step S106), and these files are stored in the external memory device 25 (step S107).

A dial list is input in advance in, e.g., a designated format. The dial list can be confirmed as needed. Either a document file or the dial list can be displayed first in a sending operation. For example, a document file is read out first, and thereafter, a destination area is designated from the dial list so as to select destination data, so that the document file and the dial list can be displayed at the same time.

At this time, whether a document file is sent to one or a plurality of destinations can be designated.

In this manner, when a sending operation is performed to a plurality of destinations, the designated destinations in the list and a document file can be sequentially synthesized and sent.

As described above, according to the second embodiment, since the means for designating a destination area in a single document text is arranged, the destination area and the remaining text document are managed independently of each other, and data can be desirably designated and input from the dial list to the destination area. Thus, a sending operation can be easily performed to a plurality of receivers, and sending efficiency can be improved.

The third embodiment of the present invention will be described below.

Figure 11:
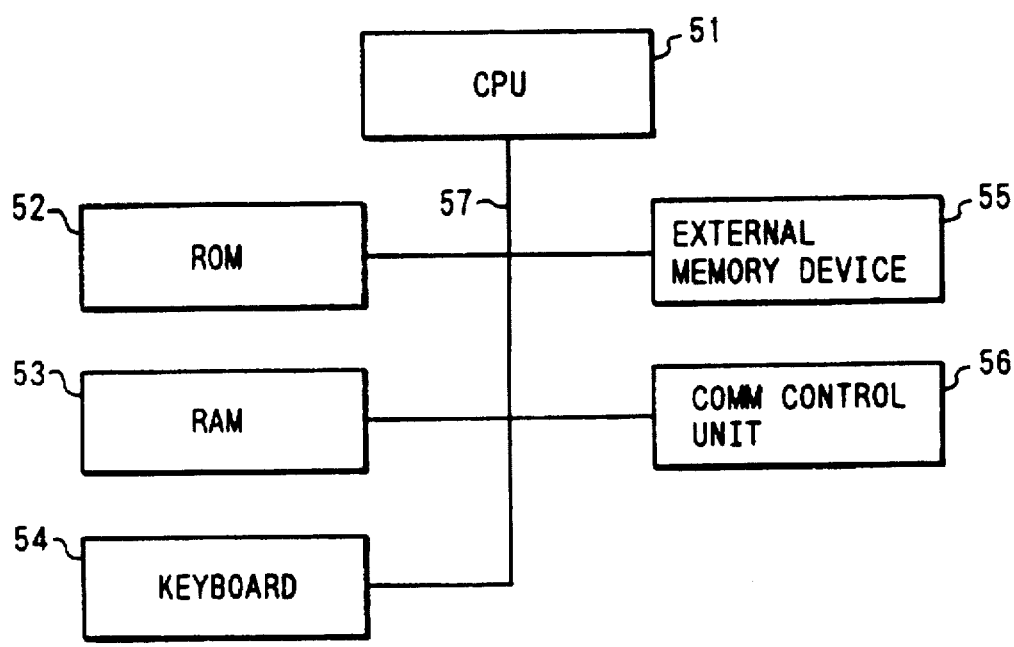
FIG. 11 is a block diagram showing the arrangement of a document processing apparatus according to the third embodiment of the present invention.

FIG. 11 is a block diagram showing the arrangement of a data processing apparatus according to the third embodiment of the present invention. In FIG. 11, the document processing apparatus comprises a CPU 51 for controlling the overall document processing apparatus, a ROM 52 for storing document processing/facsimile processing programs, character generation (CG) data, and the like, a RAM 53 necessary for document processing/facsimile processing, and a normal operation of the CPU, a keyboard 54, an external memory device 55 comprising a 20-MB hard disk, a communication control unit 56 connected to analog circuits such as a modem/NCU circuit, and a bus 57 for connecting the above-mentioned units.

This embodiment exemplifies a method of inputting and designating a destination area by the number of lines unlike in the second embodiment.

Figure 12C:
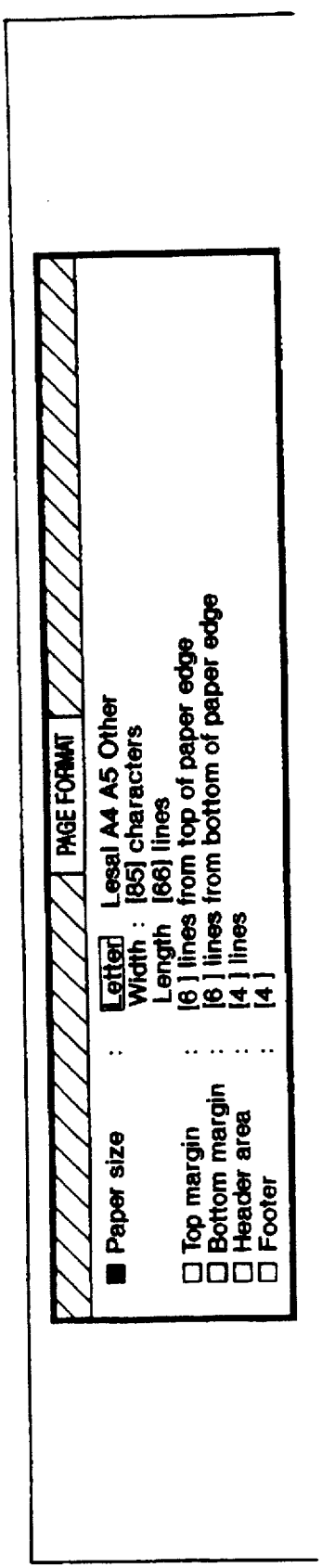
Figure 12D:
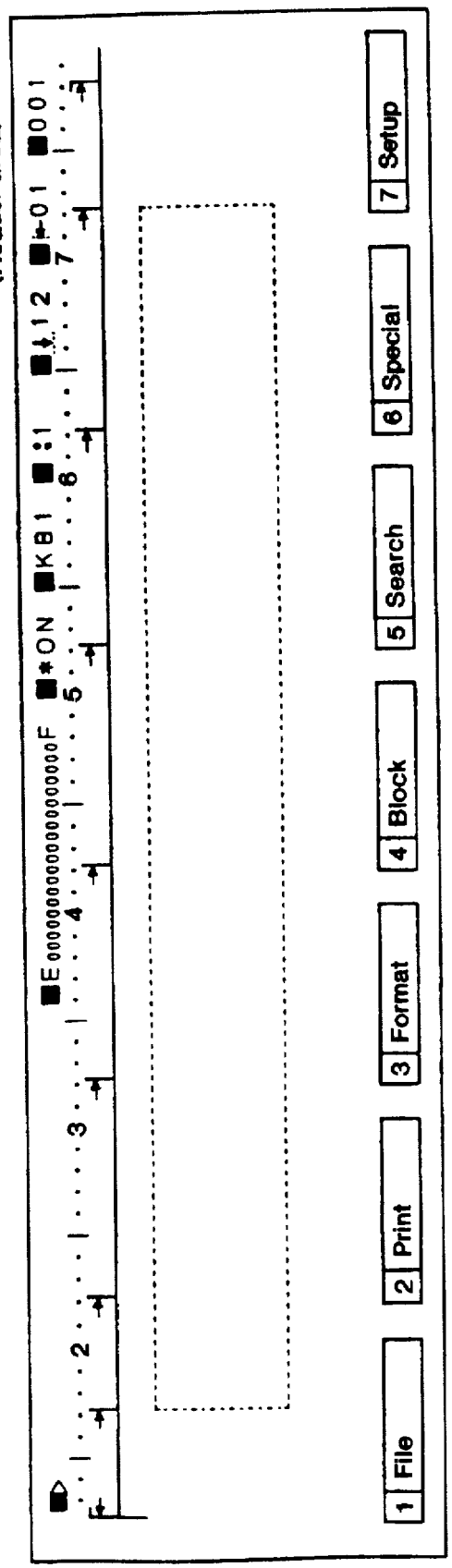

FIGS. 12A to 12D are views showing a transition in screen display according to the third embodiment. FIG. 12A shows a text editing waiting state. In this state, when a "format" designation key is depressed at the keyboard 54 in FIG. 11, a screen for designating a format is displayed, as shown in FIG. 12B. This screen includes a mode number of "destination area designation"(Header area), and when this number "3" is designated, a "Page Format" designation mode for assuring an area shown in FIG. 12C is displayed prior to document text editing processing. In this mode, the number of lines necessary for an item of "Header area" is designated to assure an area shown in FIG. 12D. Thereafter, document text editing processing is started. Thereafter, a text document is divided into a destination area file, and a text document file other than the destination area, and these files are stored in the external memory device 55 shown in FIG. 11 like in the second embodiment.

In this manner, in the third embodiment, the same effect as in the second embodiment can be obtained.

The fourth embodiment of the present invention will be described below. In the fourth embodiment, facsimile reception processing during document processing can be performed with a simple arrangement.

Figure 13:
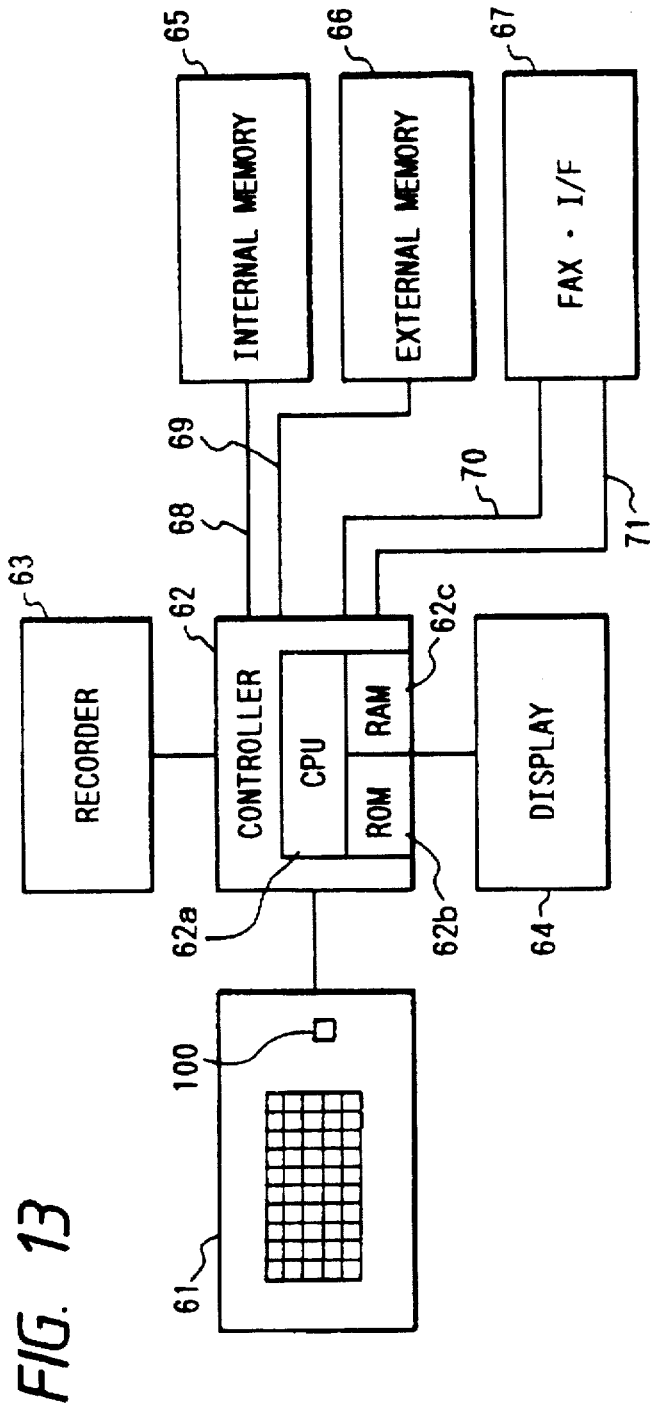
FIG. 13 is a block diagram showing the arrangement of a document processing apparatus according to the fourth embodiment of the present invention.

FIG. 13 is a block diagram showing the arrangement of a document processing apparatus according to the fourth embodiment of the present invention. In FIG. 13, the document processing apparatus comprises an input unit 61 for inputting characters, symbols, and the like, a specific key 100 on the input unit 61, a controller 62 for controlling the overall apparatus, a CPU 62a, as the central portion of the controller 62, for controlling the overall apparatus according to a program, a ROM 62b for storing a program for the operation of the CPU 62a, e.g., a program for executing some operations of the flow chart shown in FIG. 15, a RAM 62c used as a work area for various programs, a recorder 63 for recording document processing data and facsimile data, a display 64 for displaying document data, facsimile data, and the like, an internal memory 65, comprising a semiconductor memory, for storing document data under the control of the controller 62, an external memory 66 comprising a floppy disk, a FAX (facsimile)•I/F 67 comprising a modem (modulator/demodulator), an NCU (network control unit), and the like, buses and control signals 68 and 69 between the internal and external memories and the controller, a bus and a control signal 70 between the FAX•I/F and the controller, and a signal 71 for, when the FAX•I/F receives a read signal, informing this to the controller.

Figure 14:
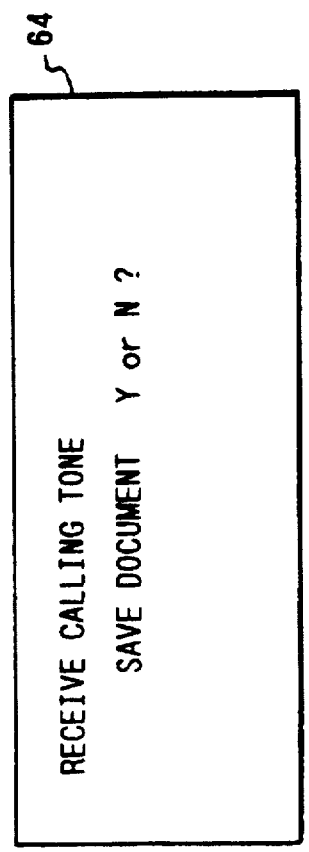
FIG. 14 is a view showing a display example according to the fourth embodiment.
Figure 15:
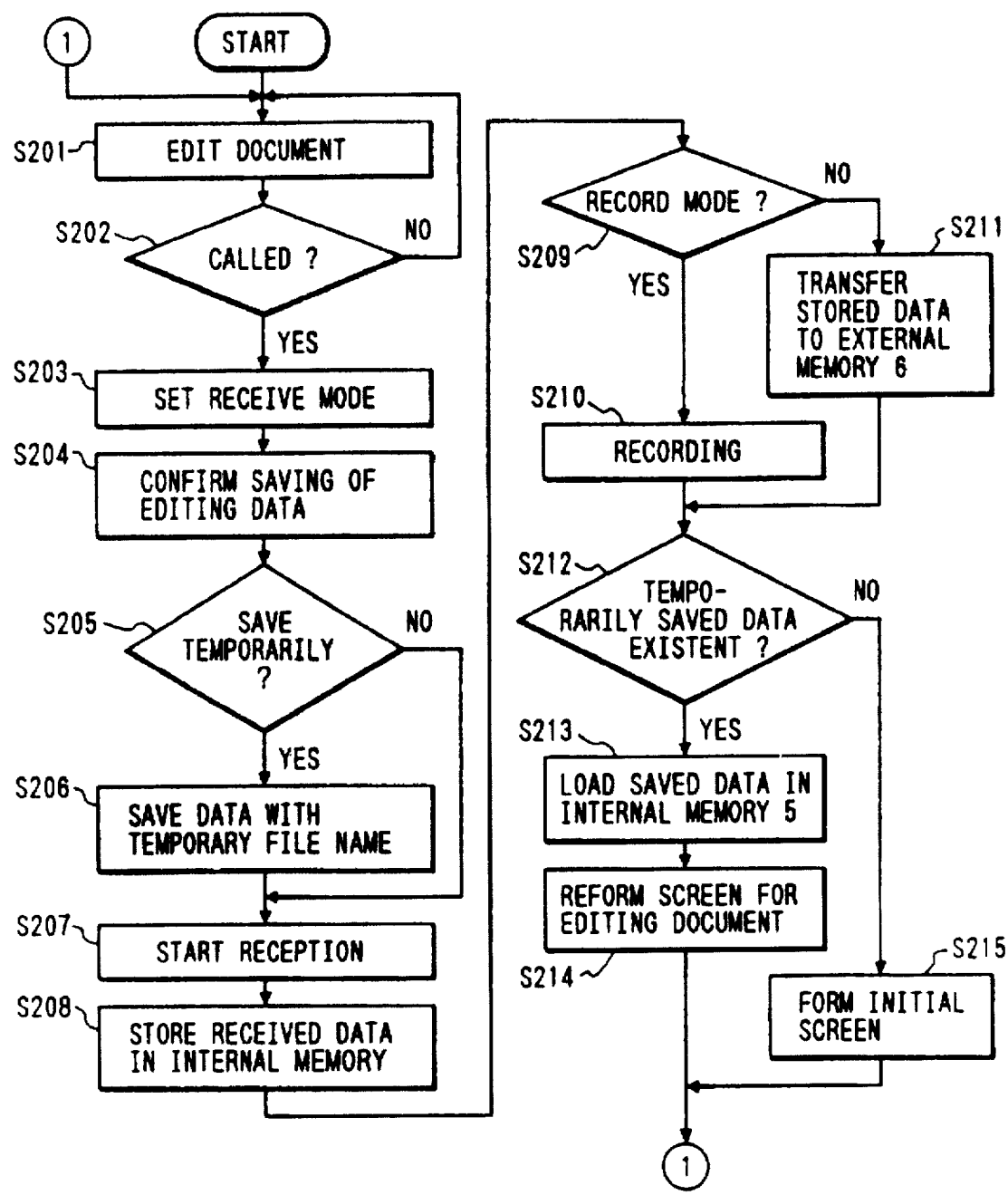
FIG. 15 is a flow chart for explaining the operation of the fourth embodiment.

FIG. 14 is a view showing a display example according to the fourth embodiment, and FIG. 15 is a flow chart for explaining the operation of the fourth embodiment.

Normally, as a document processor, document editing processing is performed at the input unit 61 using the display 64, the recorder 63, and the memories 65 and 66 under the control of the controller 62 (step S201). In this state, if the FAX•I/F receives a calling signal (step S202), a reception mode is set, and is informed to the controller 62 using the signal 71 (step S203). The controller 62 stores character and symbol data in the internal memory on the basis of input data from the input unit 61. In this case, a message asking whether or not the data stored in the internal memory are to be transferred to the external memory 66, i.e., whether or not document processing data are temporarily saved is displayed (step S204). FIG. 14 shows a display example. This display area utilizes a state display area different from that for document text data. When an operator inputs "Y" indicating yes using the specific key 100 of the input unit 61 so as to input a storage enable instruction for saving (step S205), the controller 62 transfers document data in the internal memory 65 to the external memory 66 using a temporary file name so as to temporarily save the document data step S205).

When the transfer operation for saving is ended in this manner, the controller 62 issues a reception enable command to the FAX•IF 67 (step S207). Thus, data received by the FAX•I/F 67 is stored in the internal memory 65 through the controller 62 (step S208).

Thereafter, an operator inputs an operation mode instruction from the input unit 61 (step S209), and the data stored in the internal memory 65 are output to the recorder 63 (step S210) or are transferred to and stored in the external memory 66 (step S211).

Upon completion of the reception operation, if there is document data temporarily saved in the external memory 66 (step S212), the data is read out from the external memory 66, and is transferred to the internal memory 65 (step S213). In order to restore a document processing state before reception, control is made to display the document data on the display 64, and to inform continuation of document editing (step S214). On the other hand, if it cannot be confirmed in step S212 that there is temporarily saved data, an initial screen is formed (step S215), and the flow returns to the document processing in step S201.

The arrangement of the specific key 100 will be described below. As a hardware arrangement, "Y" and "N" switches may be separately arranged, or "Y" or "N" may be selected by a slide switch or lever, and an operation may be started by another start switch.

As described above, according to the fourth embodiment, a ringing tone from a line is displayed, and when document processing is being executed, a message indicating whether or not an editing document is temporarily stored is informed to an operator. When the operator inputs a temporary storage instruction, the document is stored, and thereafter, a facsimile reception operation is started. Upon completion of the reception operation, the temporarily stored document data is read out again, and is recovered. In this manner, the memory can be commonly used in document processing and facsimile processing, so that facsimile processing can be performed even during document processing, and a compact, inexpensive arrangement can be provided.

Figure 16:
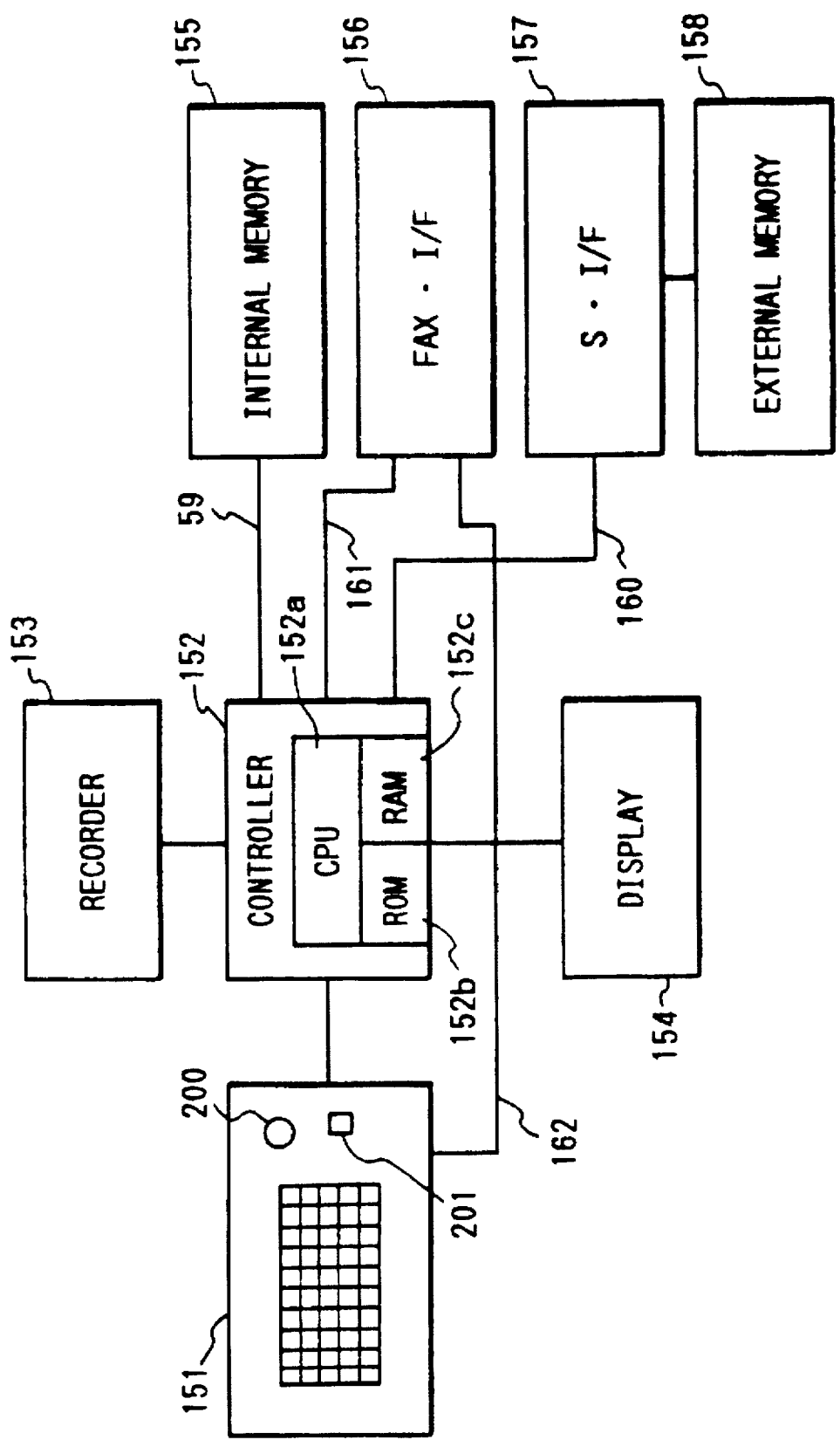
FIG. 16 is a block diagram showing the arrangement of a document processing apparatus according to the fifth embodiment of the present invention.

FIG. 16 is a block diagram showing the arrangement of a document processing apparatus according to the fifth embodiment of the present invention. In FIG. 16, the document processing apparatus comprises an input unit 151 for inputting characters, symbols, and the like. In the input unit 151, an LED (light-emitting diode) 200 (which is turned on in a calling signal reception state), and a temporary storage key 201 are arranged. The apparatus also comprises a controller 152 for controlling the overall apparatus, a CPU 152a, as the central portion of the controller 152, for controlling the overall apparatus according to a program, a ROM 152b for storing a program for the operation of the CPU 152a, e.g., a program for executing some operations of the flow chart shown in FIG. 17, a RAM 152c used as a work area for various programs, a recorder 153 for recording document processing data and facsimile data, a display 154 for displaying document data and facsimile data, an internal memory 155, comprising a semiconductor memory, for storing and editing document data under the control of the controller 152.

The apparatus further comprises a FAX•I/F 156 comprising a modem, an NCU circuit, and the like, a serial data communication interface (to be abbreviated to as an "S•I/F" hereinafter) 157 externally connected to an external memory 158, buses and control signals 159 and 160 between the internal memory 155, the S•I/F 157, and the controller 152, a bus and a control signal 161 between the FAX•I/F 156 and the controller 152, and a signal 162 for, when the FAX•I/F receives a calling signal, turning on the LED 200 in the input unit 151.

Figure 17:
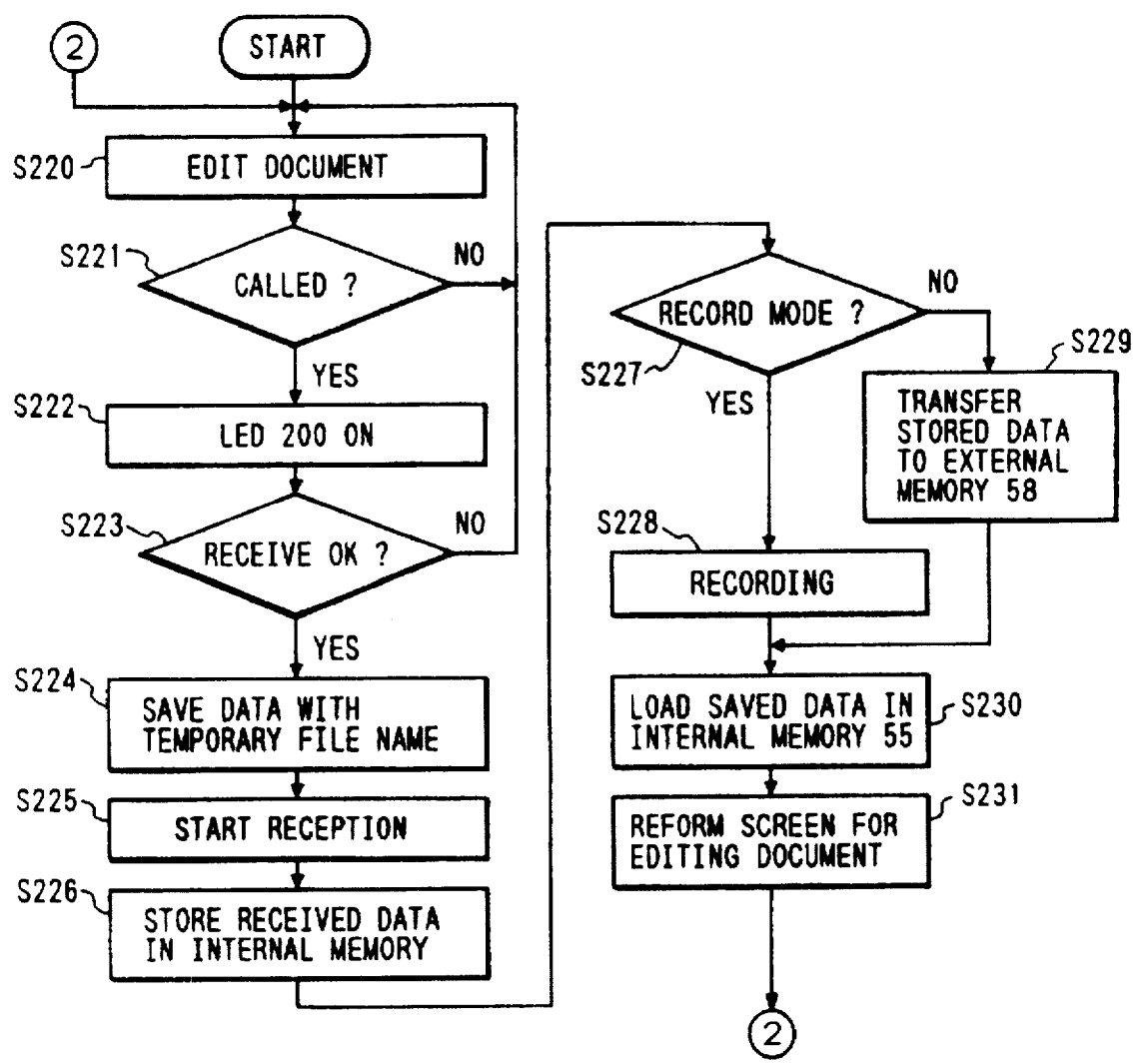
FIG. 17 is a flow chart for explaining the operation of the fifth embodiment.

FIG. 17 is a flow chart for explaining the operation of the fifth embodiment.

Normally, the apparatus of this embodiment is operated as a document processor (step S220). In this state, if the FAX•I/F 156 receives a calling signal (step S221), the LED 200 in the input unit 151 is turned on by the signal 162 (step S222). In response to this signal, an operator depresses the specific key 201 when currently edited data are temporarily stored. When this key is depressed (step S223), the controller 152 adds a temporary file name to the document data in the internal memory 155, and stores the document data in the external memory 158 through the S•I/F 157 (step S224). After the document data are saved, the controller 152 issues a reception enable command to the FAX•I/F 156 (step S225). Thus, data received by the FAX•I/F 156 are stored in the internal memory 155 through the controller 152 (step S226). Thereafter, depending on a selected operation mode (step S227), the received data stored in the internal memory 155 are output to the recorder 153 (step S228) or the data are stored in the external memory 158 through the S•I/F 157 (step S229).

Upon completion of the reception operation, the document data temporarily saved in the external memory 158 are read out from the external memory 158, and are transferred to the internal memory 155 (step S230). In order to restore a document processing state before reception, control is made to display the document data on the display 154, and to indicate continuation of document edition (step S231).

If the operator does not want to interrupt the editing of a document in step S223, the apparatus of this embodiment does not start the reception operation unless he or she depresses the specific key 201, and the operator can continue the current work (processing in step S220).

In the fifth embodiment, the LED 200 is turned on to request the operator to enable the reception operation. However, since the operator can continue document processing until he or she enables reception, the reception side can select whether or not facsimile processing interrupts the document processing.

Of course, in the fifth embodiment, the step of urging an operator to select whether or not image data in document processing is stored may be inserted between steps S223 and S224.

In the above two embodiments, the specific key 100 or 201 is arranged as a hardware switch. However, the present invention is not limited to this. For example, a software switch may be arranged. In this case, the display 64 or 154 may comprise a touch panel, and an operator may touch the display to indicate "Y" or "N".

Figure 18:
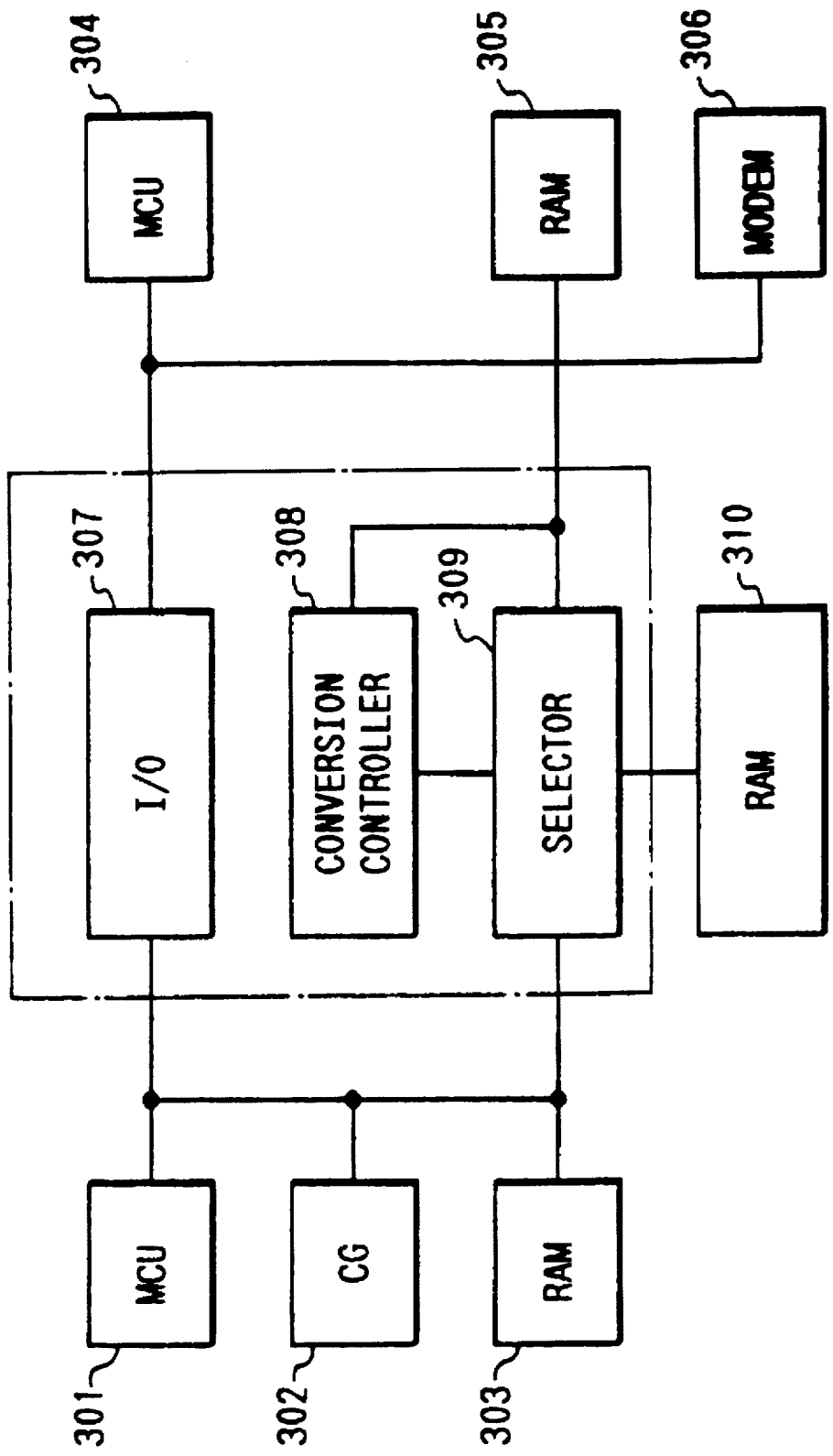
FIG. 18 is a block diagram showing the arrangement of a document processing apparatus according to the sixth embodiment of the present invention.

FIG. 18 is a block diagram showing the arrangement of a document processing apparatus according to the sixth embodiment of the present invention. In FIG. 18, the document processing apparatus comprises a microcomputer (to be referred to as an "MCU" hereinafter) 301 for performing document processing control; a character generation ROM (to be referred to as a "CG" hereinafter) 302 for a printing apparatus (e.g., a 400-dpi bubble-jet printer), which is not shown in the block diagram in the apparatus of this embodiment, a RAM 303 necessary for the operation of the MCU 301 according to a program, and for storing a document text, an MCU 304 for performing facsimile control, a RAM 305 which is necessary for the operation of the MCU 304 according to a program, temporarily stores received data, stores data obtained by compressing sending data by a data compression means such as a run-length method, and is used in modem control (to be described later); a modulator/demodulator (to be referred to as a "MODEM" hereinafter) 306 for inputting/outputting data to an analog line, an I/O 307 comprising data buffers necessary for exchanging data between the MCUs 301 and 304, and status buffers for informing states of these MCUs; a conversion controller 308 for converting CG data (vertical data) for the 400-dpi bubble-jet printer (not shown) into 200-dpi G3 facsimile data (horizontal data); a selector 309 for selectively switching accesses from the three controllers, i.e., the MCUs 301 and 304, and the conversion controller 308 to a RAM 310 (to be described later); and the RAM 310 serving as an area for storing original image data to be sent. The conversion controller 308 performs conversion using the RAM 310 under the control of the MCU 304. The MCU 304 can forcibly perform start/stop control of this conversion, and control of the selector.

In this block arrangement, a case will be described below wherein 400-dpi printing data is to be sent. In a data processing sequence in this case, original image data to be sent is formed, the original image data is converted from vertical data to horizontal data, and the horizontal data is compressed to ½ in both the vertical and horizontal directions by a so-called PRES method. Thereafter, data compression coding is performed by the run-length method. According to the above-mentioned sequence, processing is performed. In the first stage, the MCU 301 outputs a command to the I/O.

Figure 19:
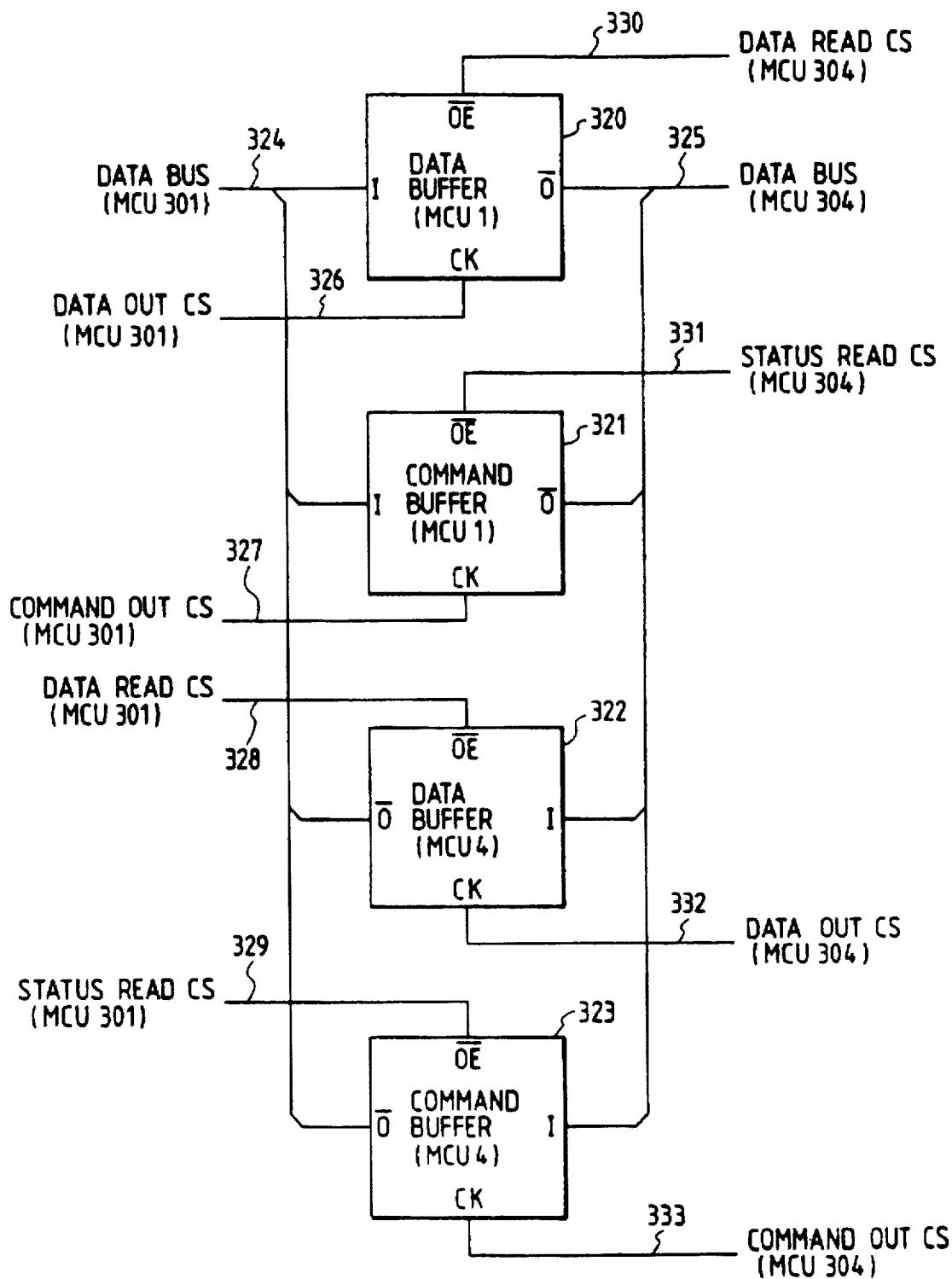
FIG. 19 is a block diagram showing the internal arrangement of an I/O according to the sixth embodiment.
Figure 20A:
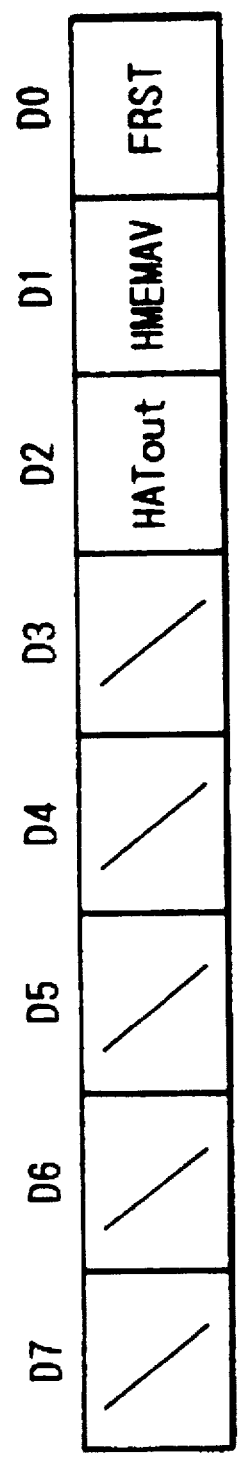
FIG. 20A and 20B are views for explaining the contents of a command buffer according to the sixth embodiment.
Figure 20B:
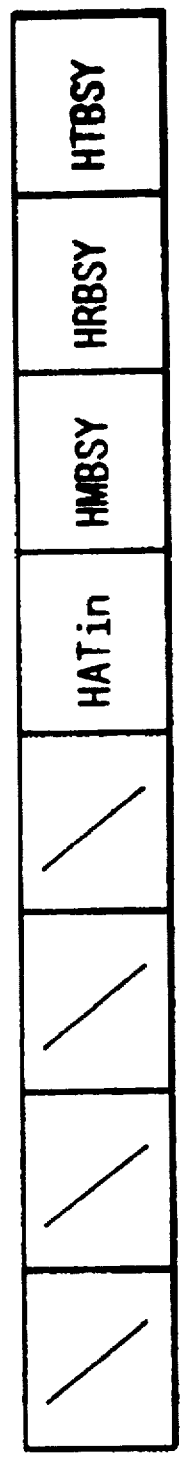

FIG. 19 is a block diagram showing the internal arrangement of the I/O according to the sixth embodiment, and FIGS. 20A and 20B are views for explaining the contents of the command buffers according to the sixth embodiment. In FIG. 19, a command buffer 321 receives a command from the MCU 301. The bit string of this command is shown in FIG. 20A. Data on a data bus 324 is written in the buffer 321 according to a command buffer chip select signal 327. Although not shown, this write access is simultaneously supplied to the MCU 304 as an interrupt signal, and the MCU 304 reads the written data from a data bus 325 according to an MCU 304 status read chip select signal 331. When a signal "HATout" shown in FIG. 20A is set to be "1" so as to set, in a buffer 320 (FIG. 19), a permission request code for requesting to write data in the RAM 310 from now, the MCU 304 reads the buffer 320 to detect the permission request since a signal "HATin" shown in FIG. 20B goes to "1". The MCU 304 then permits the selector 309 to use the RAM 310. Thereafter, the MCU 301 sets a signal "HMEAV" (FIG. 20A) to be "1" again so as to assert the use of the RAM, and transfers 400-dpi sending original image data from the RAM 303 to the RAM 310. During this interval, a signal "HMBSY" (FIG. 20B) goes to "1", and the MCU 304 and the conversion controller can detect that the RAM 310 cannot be used. A bit FRST in FIG. 20A is a forcible reset signal supplied from the MCU 301 to the MCU 304. A bit "HRBSY" in FIG. 20B is a bit indicating whether or not the MCU 301 reads a data buffer 322 (FIG. 19) for storing data to be transferred from the MCU 304 to the MCU 301, and a bit "HTBSY" is a bit indicating whether or not the MCU 304 reads the data buffer 320 (FIG. 19) for storing data to be transferred from the MCU 301 to the MCU 304.

The MCU 304 issues a vertical→horizontal data conversion command and a vertical/horizontal ½ data compression command for data written in the RAM 310 in this manner to the conversion controller 308. The conversion controller repeats read/write accesses to the RAM 310 to perform conversion. The end of conversion is communicated from the conversion controller to the MCU 304. Thereafter, the MCU 304 compression-codes the data in the RAM 310 by the run-length method, and stores the coded data in the RAM 305. The MCU 304 sends the stored data through the MODEM.

As described above, the I/O for exchanging data/status, the conversion controller for data conversion control for the two microcomputers (MCUs), and the RAM which can be accessed by the three controllers are arranged between the document processing microcomputer and the facsimile control microcomputer. Thus, the number of CG data such as CG ROM data, which must be prepared due to differences in dot density, data string, and the like, can be decreased. Furthermore, in a facsimile function separation (option) type apparatus, the load on the document processing apparatus (main body) side can be reduced as much as possible.

The seventh embodiment of the present invention will be described below.

Figure 21:
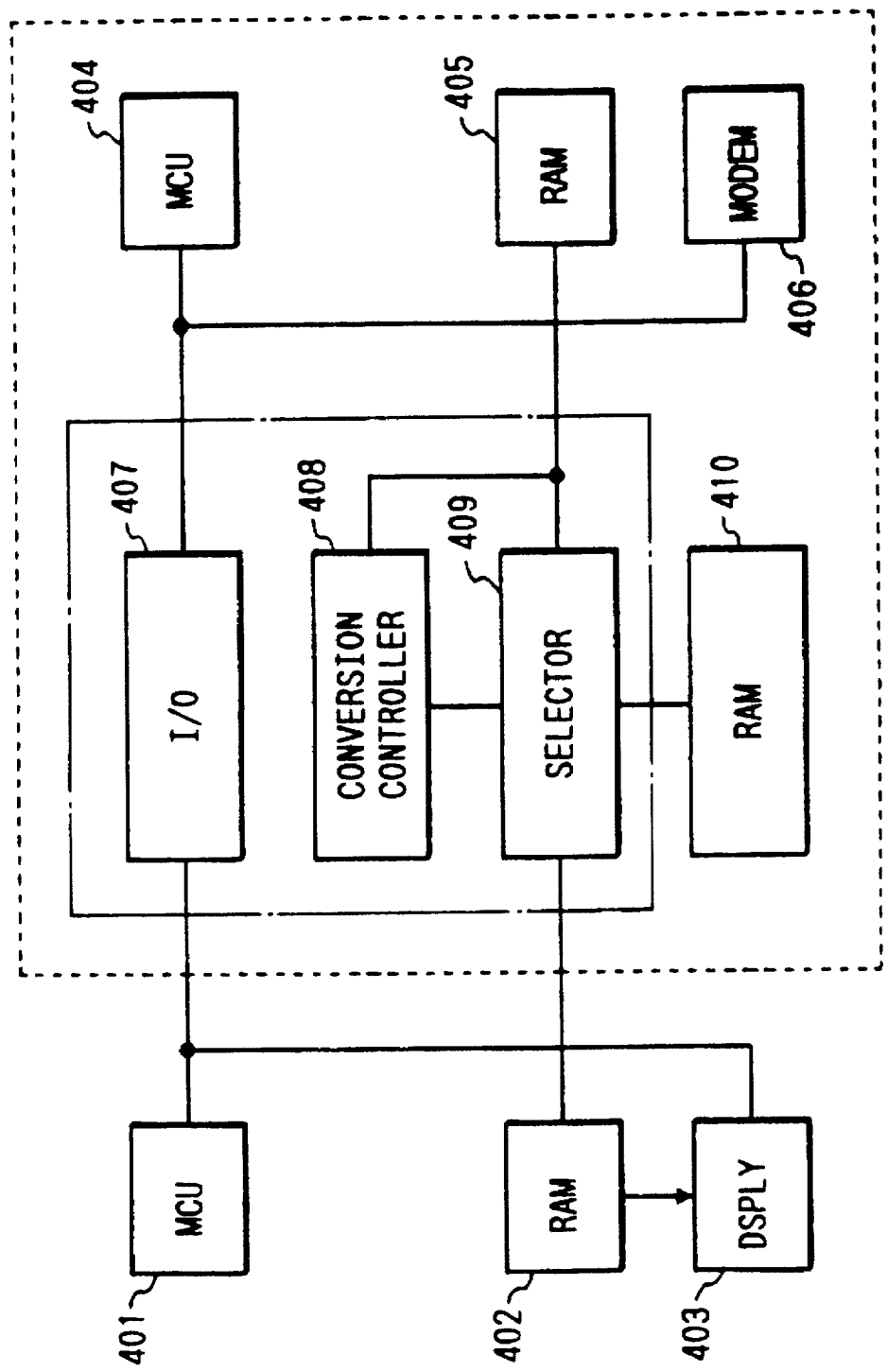
FIG. 21 is a block diagram showing the arrangement of a document processing apparatus according to the seventh embodiment of the present invention.

FIG. 21 is a block diagram showing the arrangement of a document processing apparatus according to the seventh embodiment of the present invention. In FIG. 21, the document processing apparatus comprises an MCU 401 for performing document processing control, a RAM 402 which serves as a work area for the operation of the MCU 401 according to a program, and stores a document text, and the like, a display (to be referred to as a "DSPLY" hereinafter) 403 for displaying data of this apparatus, an MCU 404 for performing facsimile control, a RAM 405 which serves as a work area for the operation of the MCU 404 according to a program, temporarily stores received data, stores data obtained by compressing sending data by a data compression means such as a run-length method, and is used in modem control (to be described later), a MODEM 406 for inputting/outputting data to an analog line, an I/O 407 comprising data buffers necessary for exchanging data between the MCUs 401 and 404, and status buffers for informing the states of these MCUs, a conversion controller 408 for converting 200-dpi facsimile G3 reception data into 100-dpi data for the DSPLY 403, a selector 409 for selectively switching accesses from the three controllers, i.e., the MCUs 401 and 404, and the conversion controller 408 to a RAM (to be described below), and a RAM 410 serving as a storage area of reception data to be displayed. The conversion controller 408 performs conversion using the RAM 410 under the control of the MCU 404. The MCU 404 can forcibly perform start/stop control of this conversion, and control of the selector.

Figure 22:
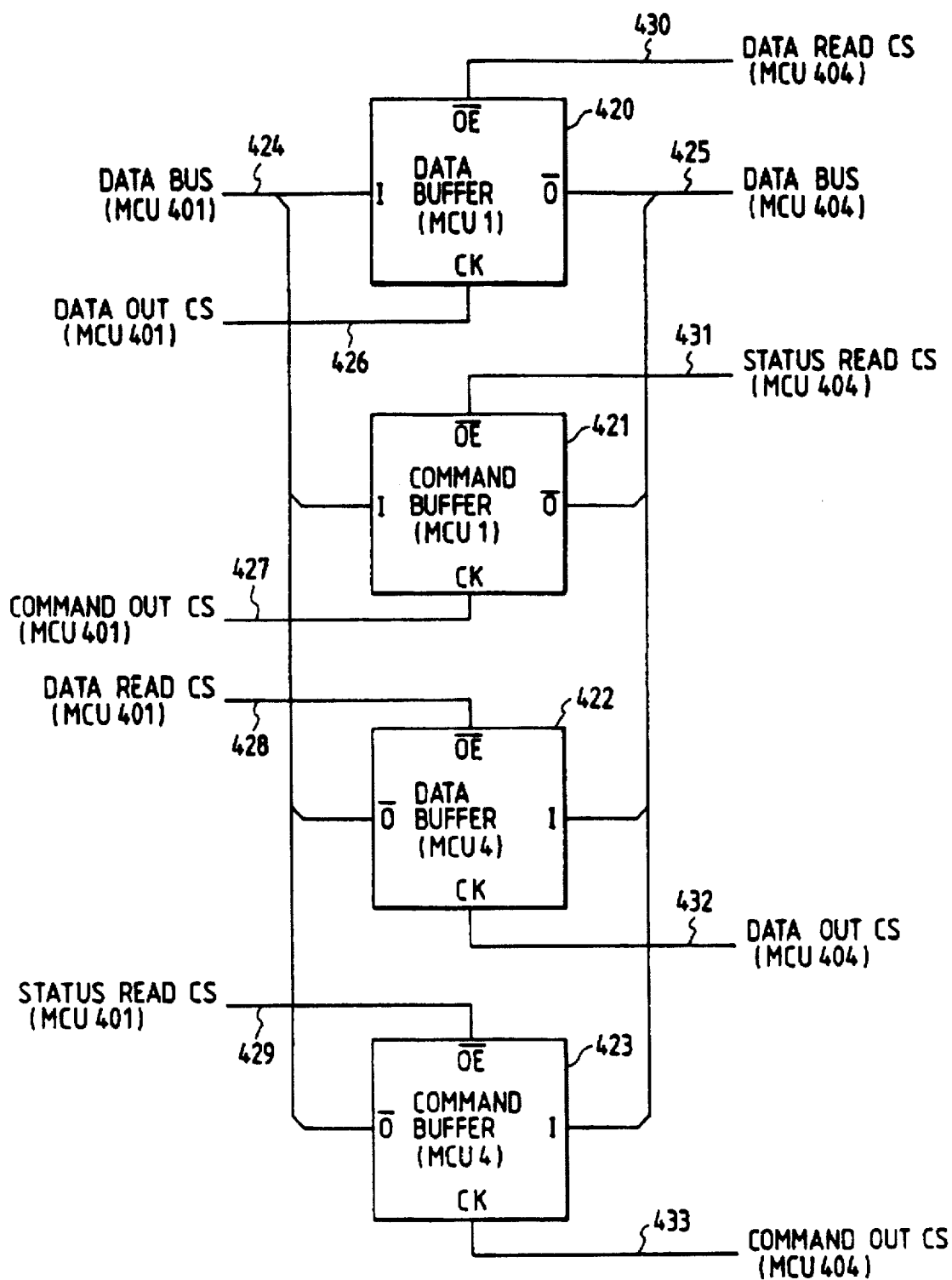
FIG. 22 is a block diagram showing the internal arrangement of an I/O according to the seventh embodiment.

FIG. 22 is a block diagram showing the internal arrangement of the I/O according to the seventh embodiment, and FIGS. 23A to 23D are views for explaining the contents of the command buffers according to the seventh embodiment.

In this block arrangement, an operation for displaying 200-dpi facsimile reception data on the DSPLY 403 will be described below. In a data processing sequence in this case, received compressed data is stored in the RAM 405 through the I/O, and the stored data is expanded by the run-length method. The expanded data is stored in the RAM 410, and the number of dots of the stored data is compressed to ½ in both the vertical and horizontal directions by a so-called PRES method. Thereafter, the compressed data is transferred to the RAM 402, and is displayed in a display video RAM. According to the above-mentioned sequence, processing is performed. In the first stage, the MCU 401 outputs a command to the I/O. The internal blocks of the I/O are shown in FIG. 22. In FIG. 22, a command buffer 421 receives a command from the MCU 401, and the bit string of this command is shown in FIG. 23A. Data on a data bus 424 is written in the buffer 421 according to a command buffer chip select signal 427. Although not shown, this write access is simultaneously supplied to the MCU 404 as an interrupt signal, and the MCU 404 reads data from an MCU 404 data bus 425 according to an MCU 404 status read chip select signal 431. When a signal "HATout" (FIG. 23A) is set to be "1" so as to set, in a data buffer 420 (FIG. 22), a permission request code for requesting to continuously write facsimile reception data in the buffer 420 from now, the MCU 404 detects based on a read signal 431 as a command byte that the reception data is transferred to the data buffer 420 since a signal "HATin" (FIG. 23B) goes to "1". Thereafter, the MCU 404 obtains data from the buffer 420 according to "1" or "0" level of a signal "HTBSY" (FIG. 23B) in the buffer 421, and stores the obtained data in the RAM 405. When a predetermined amount of data is stored in the RAM 405, the MCU 404 starts expansion according to the run-length method, and stores the expanded data in the RAM 410 by switching the selector so that the MCU 404 can access the RAM 410. Therefore, original image data of the reception data can be formed in the RAM 410. The MCU 404 instructs the conversion controller 408 to start conversion of the data stored in the RAM 410 according to a so-called PRES compression method. Thereafter, the selector is switched, so that the conversion controller 408 can access the RAM 410. Upon completion of conversion, the conversion controller 408 supplies an interrupt signal indicating the end of conversion to the MCU 404. Therefore, the MCU 404 sets a permission code for allowing reading of the content of the RAM 410 in a data buffer 422, and sets a bit "SATout" (FIG. 23C) in an MCU 401 status buffer 423 to be "1". Thus, the MCU 401 is interrupted, and reads the data in the data buffer 422 to detect that an access to the RAM 410 is permitted. In the next stage, the MCU 404 switches the selector 409 so that the MCU 401 can access the RAM 410.

The MCU 401 transfers the content of the RAM 410 to the RAM 402. Thereafter, the reception data is displayed on the DSPLY 403 in a compression state on the basis of the data stored in the RAM 410.

The eighth embodiment of the present invention will be described below. In this embodiment, conversion processing of, e.g., the dot density can be facilitated.

Figure 24:
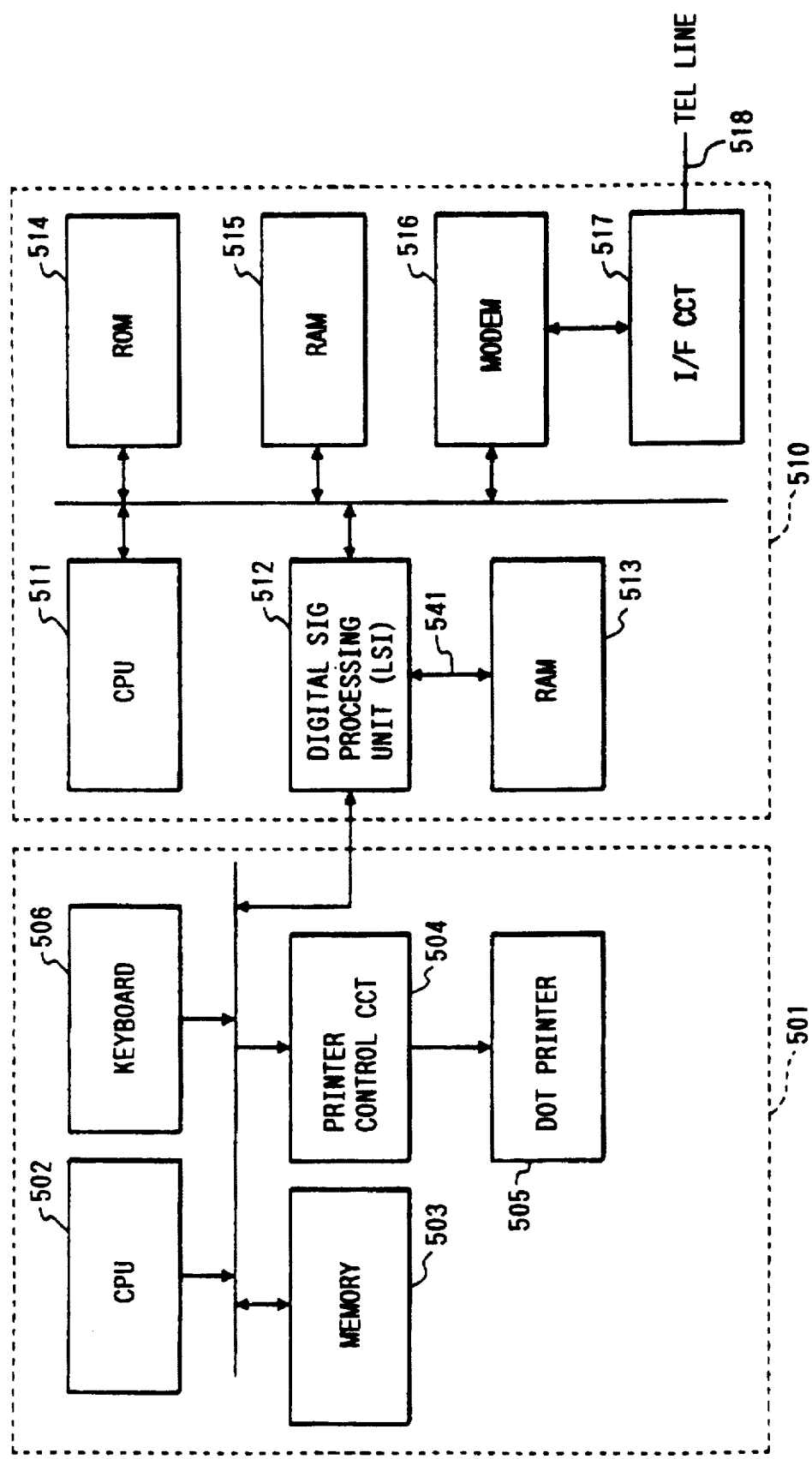
FIG. 24 is a block diagram showing the arrangement according to the eighth embodiment of the present invention.

FIG. 24 is a block diagram of a system for printing a signal from a facsimile interface 510 using an electronic typewriter according to the eighth embodiment.

In FIG. 24, an electronic typewriter 501 is mainly constituted by components 502 to 506, i.e., a CPU 502 comprising, e.g., a microprocessor for controlling the overall electronic typewriter 501, a memory 503 comprising a ROM, a RAM, and the like for storing a control program for the CPU 502 for controlling the operation of the electronic typewriter, character fonts for bit-map developing input character codes, and document data, a printer control circuit 504 for controlling a dot printer 505, and outputting recording data to the printer 505, the printer 505 for receiving dot image data from the printer control circuit 504, and recording the received data on a recording medium such as a recording paper sheet, and a keyboard 506 which is operated by an operator to input document data to be printed by the dot printer 505, various instruction data, and the like.

The electronic typewriter 501 is connected to the facsimile interface 510. The facsimile interface 510 is mainly constituted by components 511 to 517, i.e., a CPU 511 for controlling the overall interface 510, a digital signal processing unit 512 for exchanging data between the CPUs 502 and 511, and performing, e.g., dot-density conversion between the interface 510 and the electronic typewriter 501, a RAM 513 which provides a work area for the digital signal processing unit 512, a ROM 514 for storing a control program for the CPU 511; a RAM 515 used as a work area and a data buffer for the CPU 511; and a modem 516 and an interface circuit 517 for outputting digital image data onto a telephone line. The interface 510 is connected to a telephone line 518 through the interface circuit 517.

Figure 25:
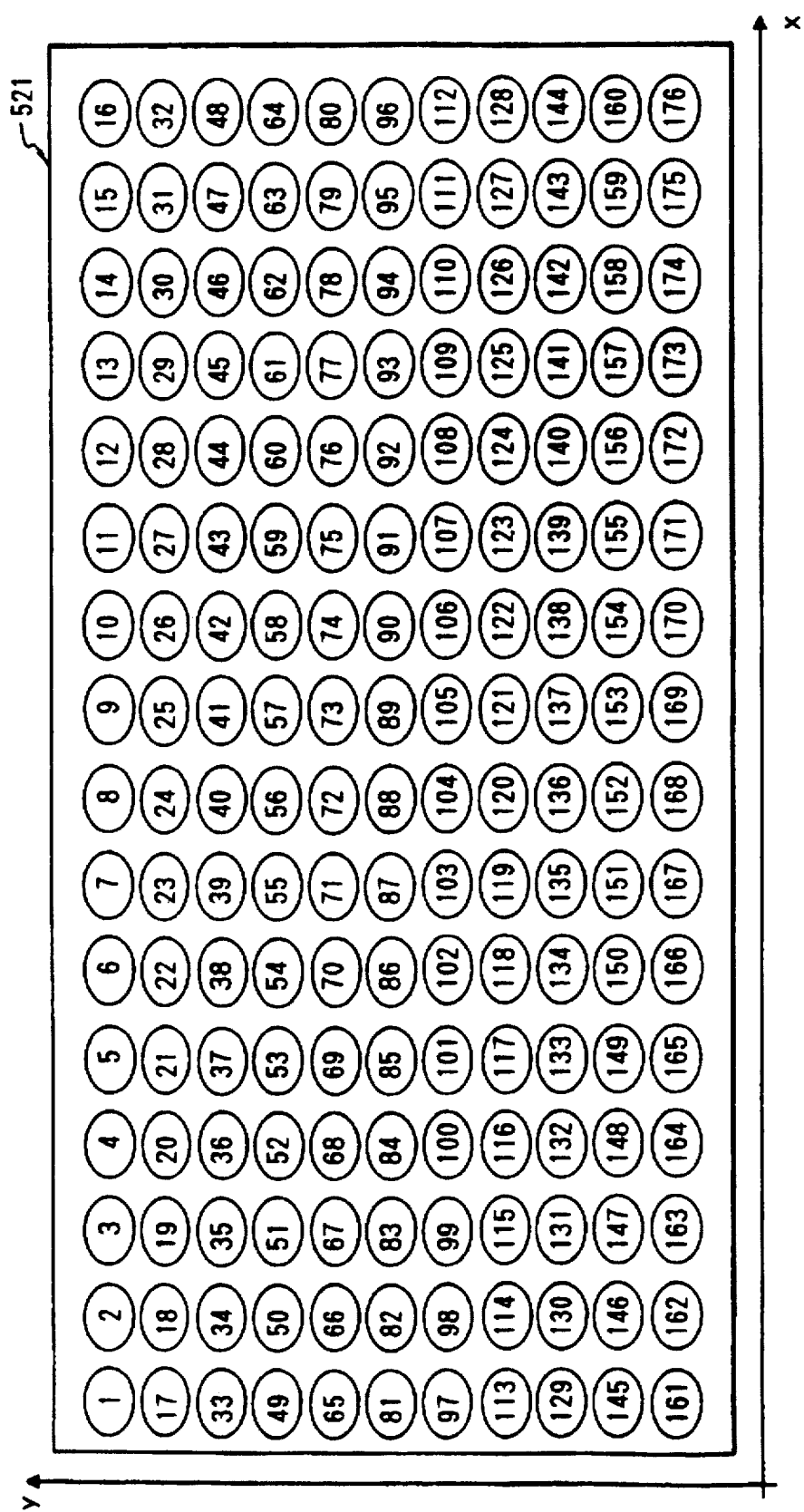
FIG. 25 is a view two-dimensionally showing the format of input dot image data.

FIG. 25 two-dimensionally shows image data to be processed by the facsimile interface 510.

In FIG. 25, 521 indicates an image data plane, and each of numerals (1) to (176) enclosed in circles indicates one dot. The x- and y-axes on this image plane 521 are set, as shown in FIG. 25.

FIG. 26 shows a state wherein these dot data (1) to (176) are developed in the 8-bit RAM 513. The dot data are continuously bit-map developed from the upper left end in FIG. 25 in the x-direction in units of 8 bits at addresses 0000H (H represents hexadecimal notation) to 0015H on the RAM 513.

Figure 27:
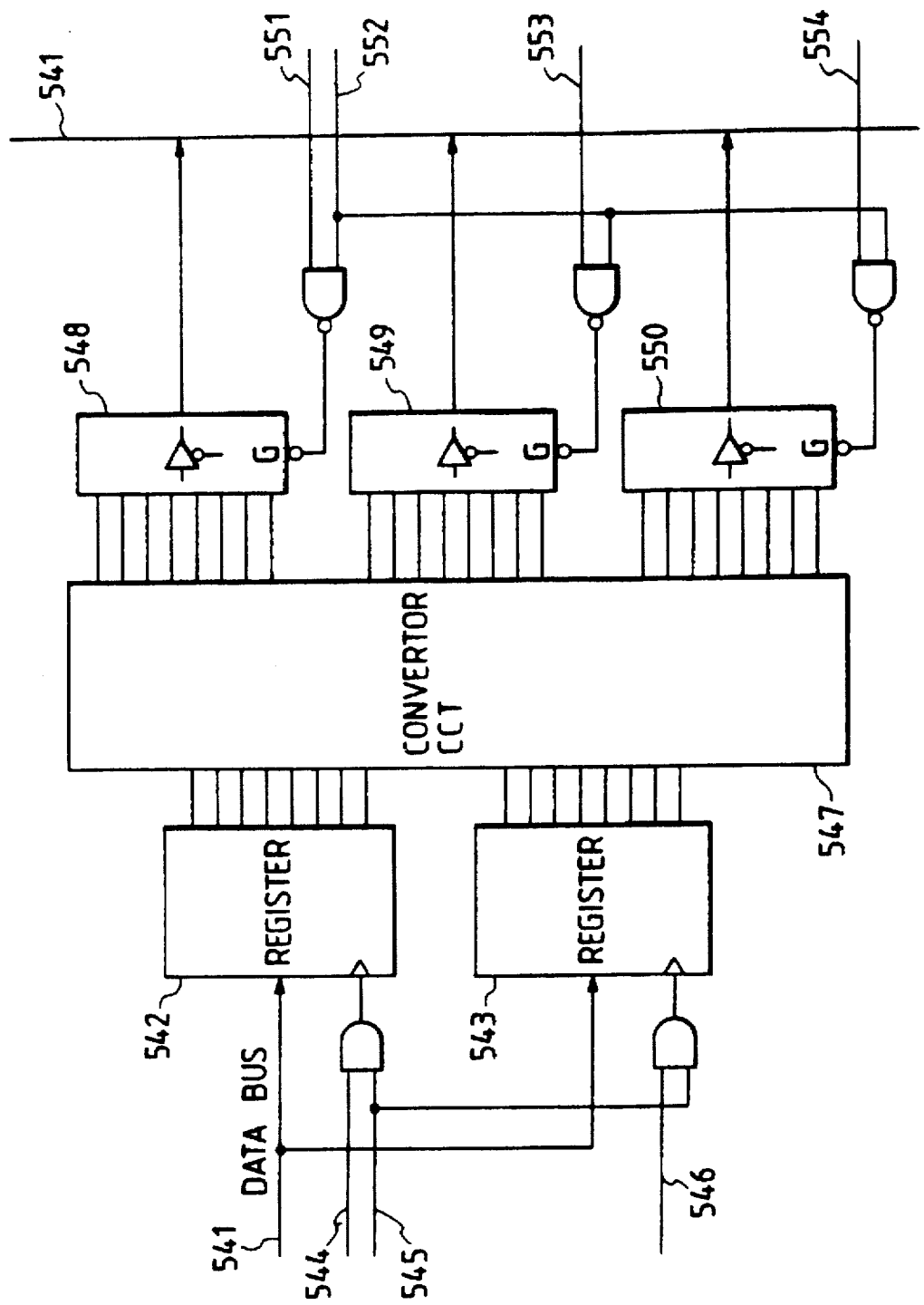
FIG. 27 is a diagram of an x-direction dot-density converter circuit included in a digital signal processing unit of the eighth embodiment.

FIG. 27 is a block diagram showing the arrangement of a dot-density conversion processing circuit included in the digital signal processing unit 512 (LSI).

In FIG. 27, the dot-density conversion processing circuit comprises a data bus 541, and 8-bit registers 542 and 543, which are respectively selected by chip select signals 544 and 546. Data on the data bus 541 is written in these registers according to a write signal 545. A converter circuit 547 enlarges input data (a total of 16 bits) from the registers 542 and 543 to 24-bit data, and outputs the 24-bit data. Output buffers 548 to 550 output 8-bit signals (a total of 24 bits) output from the converter circuit 547 onto the data bus 541 according to a read signal 552 and chip select signals 551, 553, and 554.

More specifically, 2-byte data stored at the continuous addresses of the RAM 513 (FIG. 26) is read out, the lower 8-bit data is input to and stored in the register 542, and the upper 8-bit data is input to and 10 stored in the register 543. In this manner, the output buffers 548, 549, and 550 are enabled in turn to read out data onto the data bus 541, thereby obtaining converted 3-byte data.

FIG. 28 shows the conversion result of the data stored in the RAM 513 shown in FIG. 26.

For example, data at address 0000H on the RAM 513 is input to the register 542, and data at address 0001H is input to the register 543. The output buffer 548 is enabled to write the read data at address 0100H on the RAM 513, the output buffer 549 is enabled to write the read data at address 0101H on the RAM 513, and the output buffer 550 is then enabled to write the read data at address 0102H on the RAM 513.

In this manner, 2-byte source data shown in FIG. 26 is read and written in the registers 542 and 543, and converted 3-byte data is read out and written in the RAM 513. When these operations are repeated, a series of converted data as shown in FIG. 28 can be obtained. In this manner, dot-density conversion processing of image data in the x-direction is completed.

Figure 29:
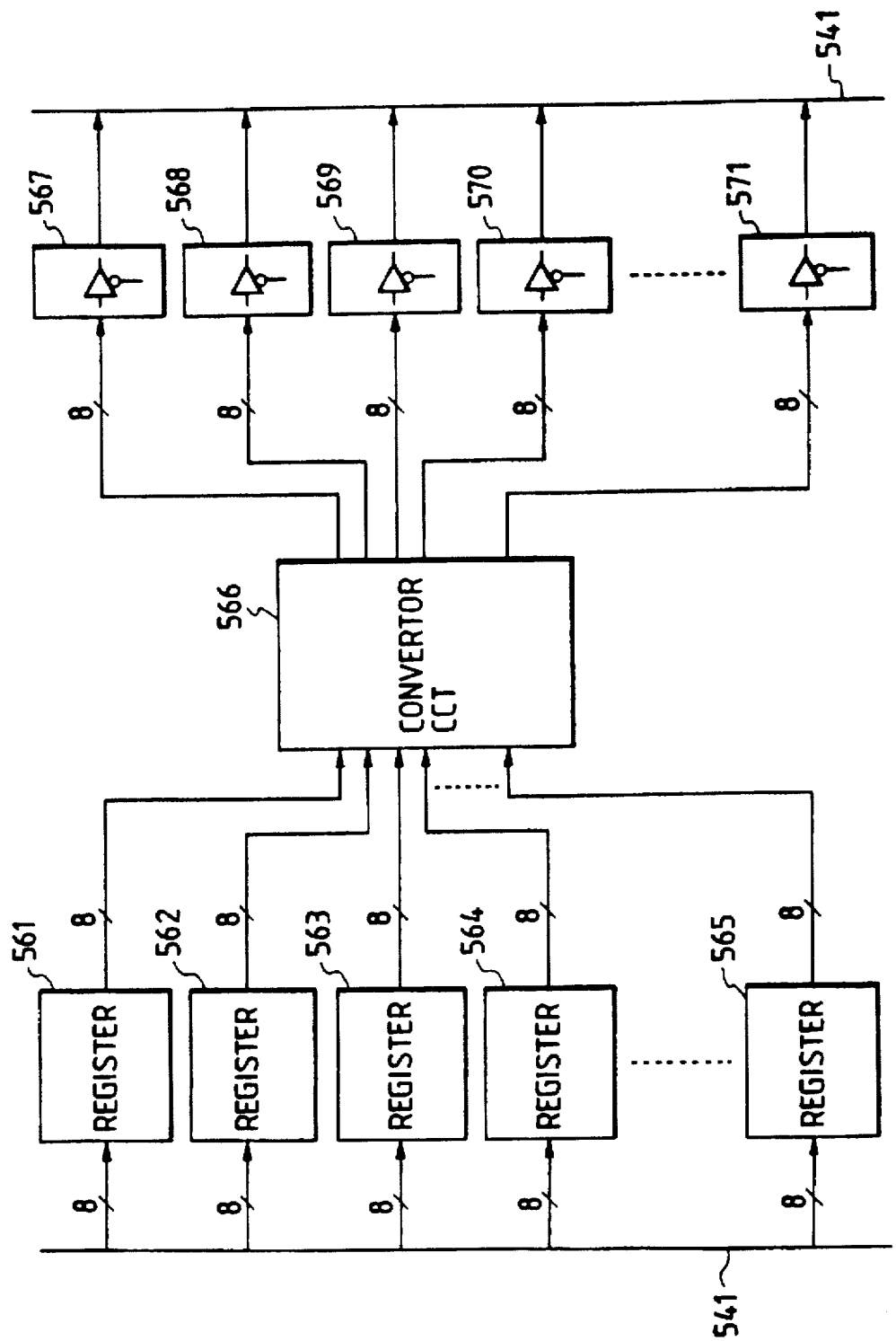
FIG. 29 is a block diagram showing the arrangement of a vertical/horizontal converter circuit included in the digital signal processing unit of the eighth embodiment.

FIG. 29 is a block diagram showing the arrangement of a vertical/horizontal converter circuit for converting dot data in the y-direction into dot data in the x-direction.

In FIG. 29, the data bus 541 of the RAM 513 is connected to registers 561 to 565 for storing 8-bit data to vertical/horizontal-convert data in the RAM 513. Although FIG. 29 illustrates only five registers, a total of eight registers are connected in practice. A converter circuit 566 vertical/horizontal-converts data (a total of 64 bits) output from the registers 561 to 565, and outputs 64-bit data. 8-bit output buffers 567 to 571 determine 1-byte data of 8-byte data converted by the converter circuit 566 to be output to the data bus 541.

The operation will be described in detail below. The content at address 0100H on the RAM 513 (FIG. 28) is set in the register 561; the content at address 0103H, the register 562; the content at address 0106H, the register 563; the content at address 0109H, the register 564; the content at address 010CH, the next register; the content at address 010FH, the further next register; the content at address 0112H, the next register; and the content at address 0115H, the register 565. Thereafter, the output results are read out through the output buffers 567 to 571. Data read out from the output buffer 567 is stored at address 0200H on the RAM 513; data read out from the output buffer 568, at address 0202H; data read out from the output buffer 569, at address 0204H; data read out from the output buffer 570, at address 0206H; and data read out from the output buffer 571, at address 020EH on the RAM 513.

FIG. 30 shows the data format obtained when all the data in the memory space shown in FIG. 28 are converted according to the above-mentioned sequence, and the converted data are stored in the RAM 513 again.

In FIG. 30, data indicated by x is unknown data due to shortage of data. In other words, this data can assume either a value "1" or "0" since it is input from a space where there is no data.

When the vertical/horizontal conversion shown in FIG. 30 is performed in this manner, two consecutive bytes in the RAM 513 are enlarged in the x-direction using the dot-density converter circuit shown in FIG. 27.

More specifically, the content at address 0200H on the RAM 513 is input to the register 542, and the content at address 0201H is input to the register 543. Thereafter, data read through the output buffer 548 is written at address 0200H on the RAM 513, and data read through the output buffer 549 is written at address 0201H. In this case, since the input 2-byte data includes short data, data obtained through the output buffer 550 is not used.

FIG. 31 shows the execution result of the above-mentioned operation over the entire area on the RAM 513 shown in FIG. 30. When data are enlarged in this manner, unknown data (x) shown in FIG. 30 can be eliminated, and data are stored in the entire memory space on the RAM 513.

Furthermore, FIG. 32 shows the result obtained by converting the data in the y-direction shown in FIG. 31 into data in the x-direction using the vertical/horizontal converter circuit shown in FIG. 29.

For example, the content at address 0200H shown in FIG. 31 is set in the register 561; the content at address 0202H, the register 562; the content at address 0204H, the register 563; the content at address 0206H, the register 564; and similarly, the content at address 020EH, the register 565. The output from the output buffer 567, as data after vertical/horizontal conversion, is stored at address 0300H on the RAM 513; the output from the output buffer 568, at address 0303H; the output from the output buffer 569, at address 0306H; the output from the output buffer 570, at address 0309H; and similarly, the output from the output buffer 571, at address 0315H on the RAM 513.

FIG. 32 shows converted image data obtained in this manner.

Figure 33:
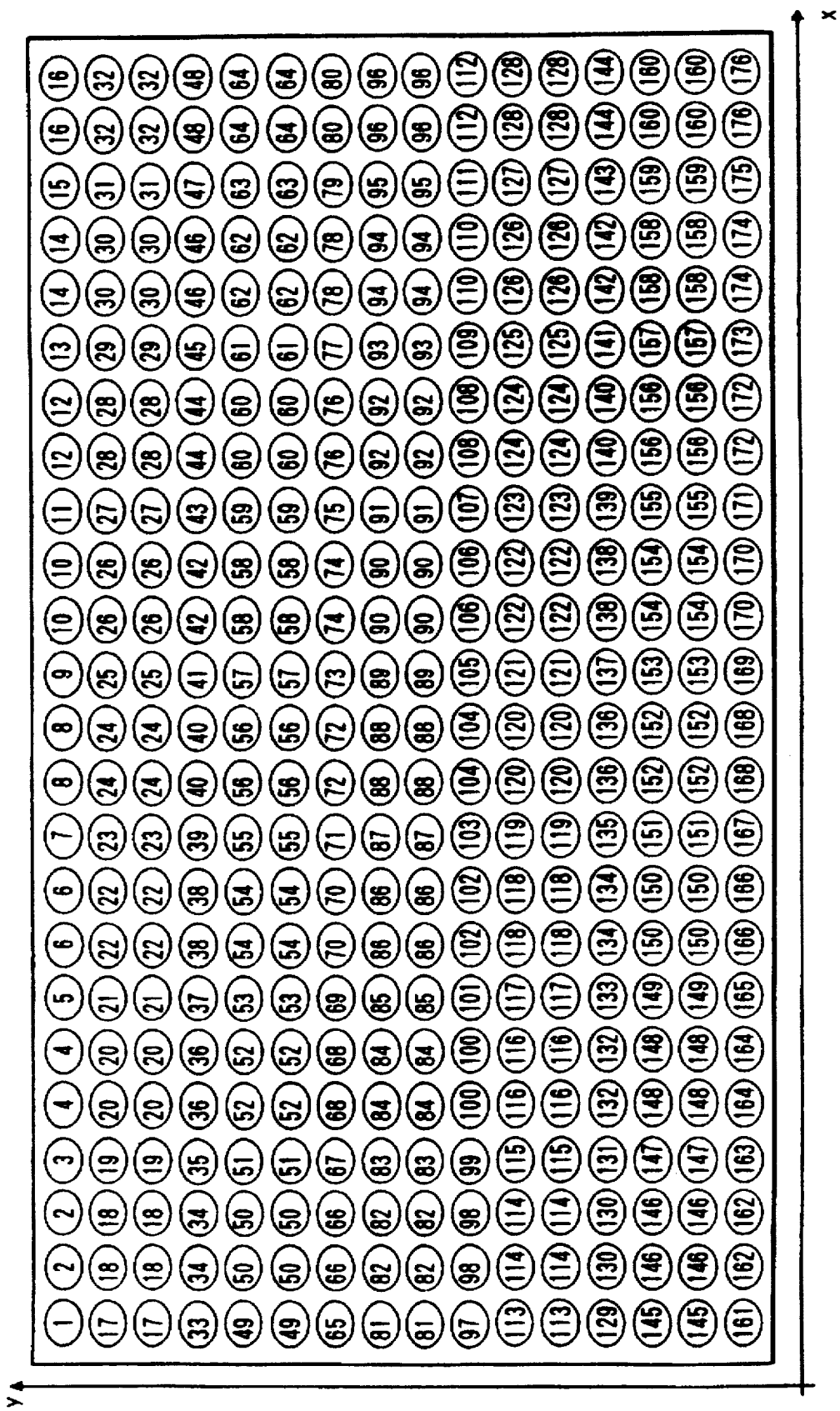
FIG. 33 is a view showing the format of image data converted by the digital signal processing unit of the eighth embodiment.

After all the above-mentioned sequences, image data before conversion shown in FIG. 25 is converted into image data shown in FIG. 33 through the dot-density conversion processing of this embodiment.

Figure 34:
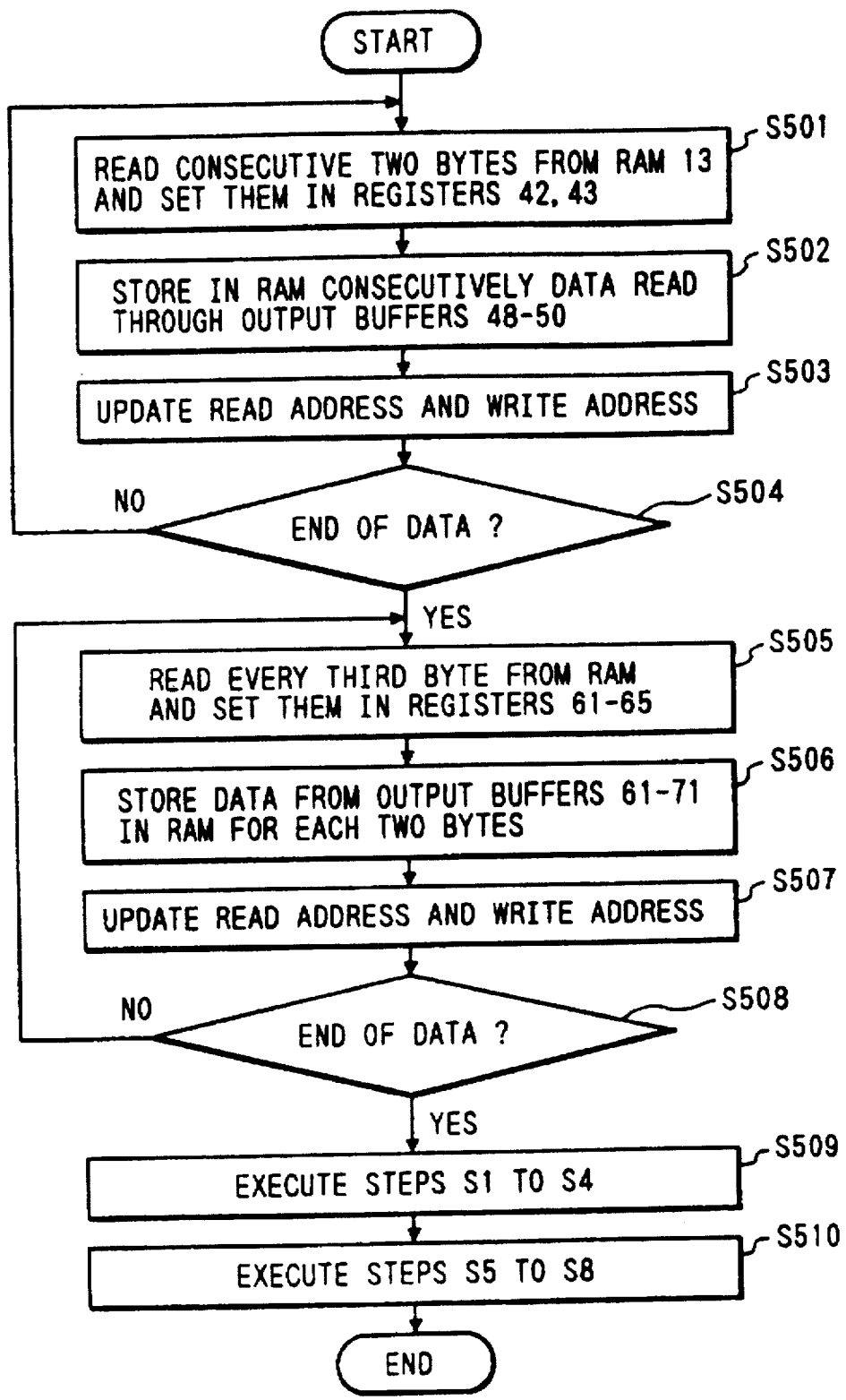
FIG. 34 is a flow chart showing a conversion operation of the digital signal processing unit of the eighth embodiment.

FIG. 34 is a flow chart showing data conversion processing executed by the digital signal processing unit 512 of the eighth embodiment.

This processing is started when image data is stored in RAM 513, as shown in, e.g., FIG. 26. In step S501, continuous 2-byte data is read out from the start address of the RAM 513, and the 8-bit data are respectively set in the registers 542 and 543. The flow advances to step S502, and data read out through the output buffers 548 to 550 are continuously written at address 0100H to address 0102H. The read address of the RAM 513 is incremented by two, i.e., to address 002H, and the write address to the RAM 513 is incremented by three, i.e., to address 0103H. The flow then returns to step S501 to perform the above-mentioned processing. When this processing is performed for all the data, image data enlarged in the x-direction can be stored from address 0100H on the RAM 513, as shown in, e.g., FIG. 28.

The flow advances to step S505, and data at every third addresses (0100H, 0103H, 0106H, ...) are read out from the RAM 513 from, e.g., address 0100H, and the readout data are set in the registers 561 to 565 in the circuit shown in FIG. 29. In step S506, 1-byte data are read out through the output buffers 567 to 571, and the readout data are stored in the RAM 513 from, e.g., address 0200H in units of two bytes (0200H, 0201H; 0202H, 0203H; ...). When this processing is performed for all the data, the data are converted, as shown in, e.g., FIG. 30, and the converted data are stored in the RAM 513.

The flow advances to step S509, continuous two byte data read out from address 0200H on the RAM 513 are set in the registers 542 and 543 in the circuit shown in FIG. 27 in the same manner as in steps S501 to S504 described above, and data read out through the output buffers 548 to 550 are sequentially stored in the RAM 513 from address 0200H. Thus, as shown in FIG. 31, data enlarged in the x-direction can be stored from the address 0200H on the RAM 513. In this case, since the read and write addresses overlap each other, data stored at a given address must be read out and stored before data is written at the given address.

The flow then advances to step S510. In step S510, image data stored at every third addresses from address 0200H are read out from the RAM 513 like in steps S505 to S508, and are set in the registers 561 to 565. Data output from the output buffers 567 to 571 are stored in the RAM 513 from address 0300H in units of two bytes. When this processing is performed for all the data, image data is converted, as shown in FIG. 32.

In this manner, according to this embodiment, since a magnification converter circuit in one direction, and a vertical/horizontal converter circuit for performing vertical/ horizontal conversion of image data are arranged, image data can be easily enlarged or reduced in both the x- and y-directions.

In this embodiment, only enlargement processing of image data is exemplified. However, for example, the converter circuit 547 shown in FIG. 27 may comprise a reduction circuit, so that image data can be easily reduced.

Figure 35:
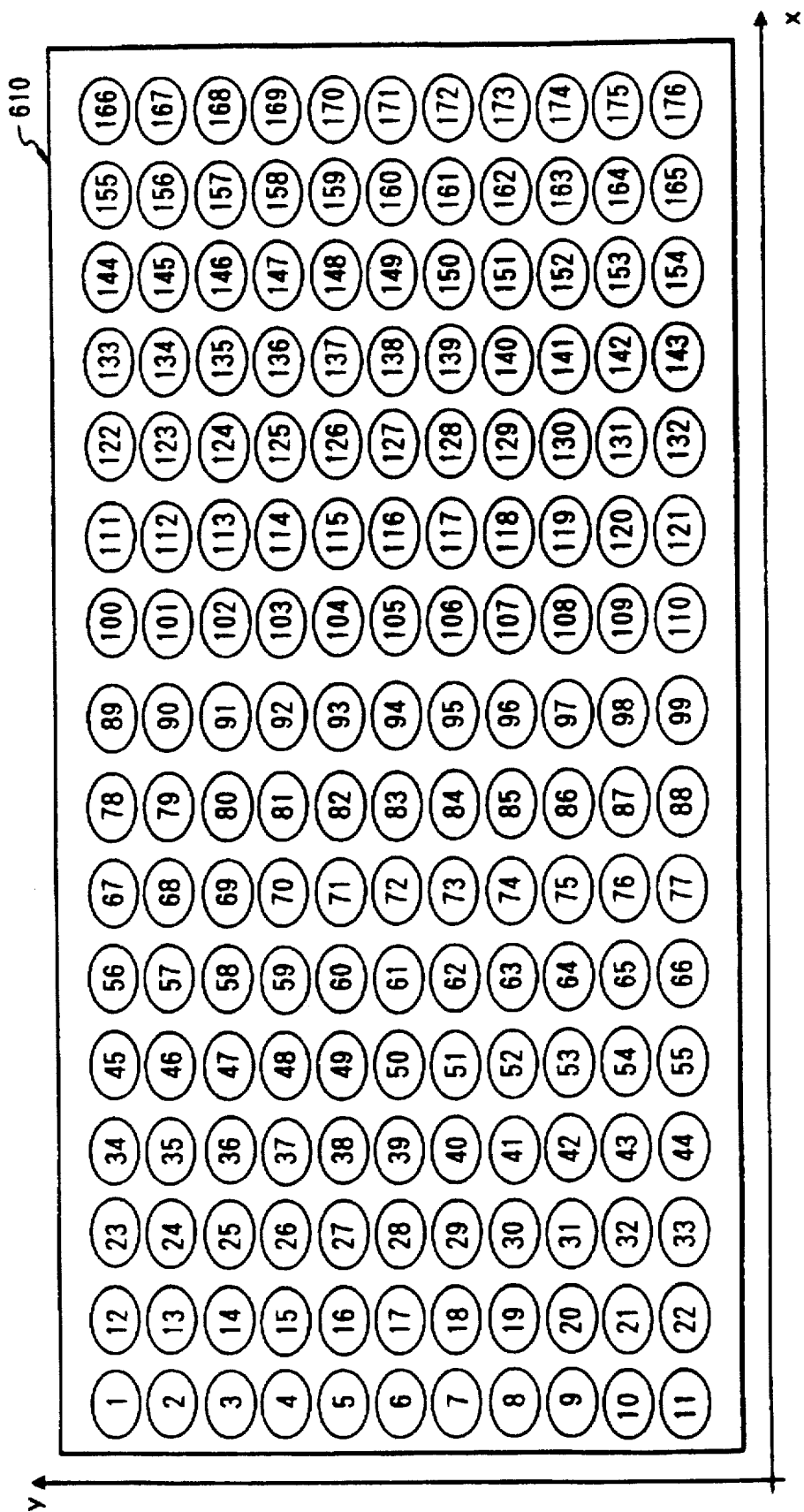
FIG. 35 is a view two-dimensionally showing the format of input dot data according to the ninth embodiment of the present invention.

FIG. 35 is a view showing dot development of image data according to the ninth embodiment of the present invention.

FIG. 36 shows a state wherein image data 610 present as shown in FIG. 35 are stored in turn from the upper left end of the plane in FIG. 35 in the y-direction in units of 8 bits.

As shown in FIG. 36, since each address of the RAM 513 consists of one byte, continuous image data are stored in units of bytes. However, as can be seen from FIG. 35, since image data consist of 11 dots in the y-direction, when data in one column are stored in two bytes, the remaining five bits become short data (x).

FIG. 37 shows a state wherein image data stored in the RAM 513 as shown in FIG. 36 are subjected to dot-density conversion using the circuit shown in FIG. 27, and the converted data are stored in the RAM 513. Furthermore, FIG. 38 shows a state wherein the data shown in FIG. 36 are developed using the vertical/horizontal converter circuit shown in FIG. 29 to have the same date format in the x-direction as that in the y-direction, and the developed data are stored in the RAM 513. Moreover, FIG. 39 shows the result obtained by converting the data shown in FIG. 38 using the converter circuit shown in FIG. 27.

As described above, according to this embodiment, when the magnification of dot data such as image data must be converted in both the x- and y-directions, the dot density is converted in one of the x- and y-directions. Upon conversion in the other direction, after the dot format is converted using the vertical/horizontal converter circuit, the dot density is converted in the other direction.

Since the vertical/horizontal converter circuit is arranged, the data format before dot-density conversion may be either horizontal data (image data stored in the memory so that dots are continuous in the x-direction) or vertical data (image data stored in the memory so that dots are continuous in the y-direction).

When the dot-density conversion function of this embodiment is provided, the dot density of image data from, e.g., a facsimile apparatus having a resolution of 200 dpi is increased through the processing of this embodiment to have the same resolution as a printer having another resolution, and the converted image data can be printed.

The tenth embodiment of the present invention will be described below. In this embodiment, the dot density of image data is converted in the y-direction. In this case, continuous bytes in the vertical direction are read, and are enlarged/reduced.

Figure 40:
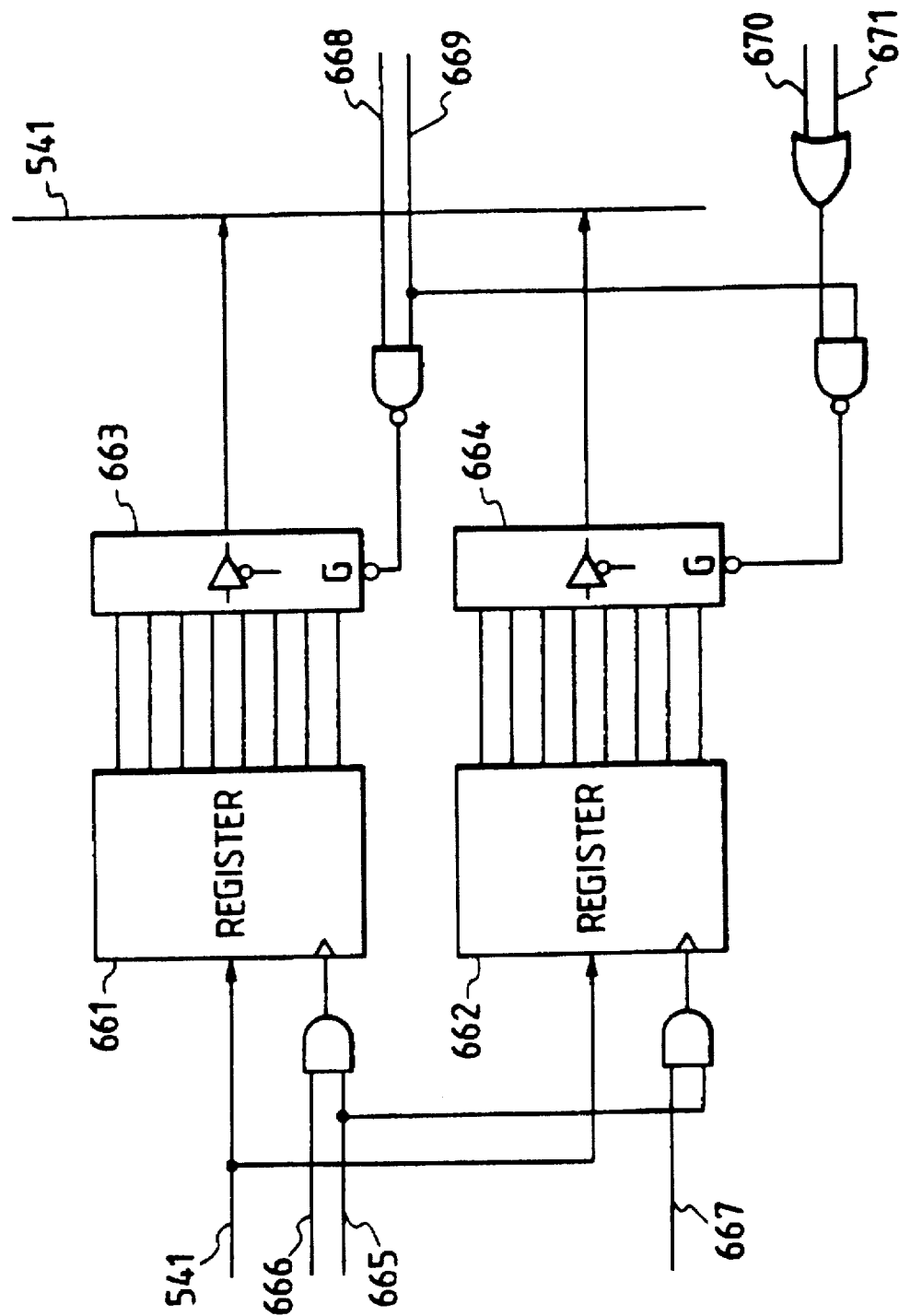
FIG. 40 is a diagram of a y-direction dot-density converter circuit included in a digital signal processing unit of the tenth embodiment.

FIG. 40 is a block diagram showing the arrangement of a converter circuit for executing dot-density conversion processing in the y-direction. This circuit is arranged in the digital signal processing unit 512.

The above-mentioned data bus 541 is connected to registers 661 and 662 for receiving data to be converted. The registers 661 and 662 are respectively selected by chip select signals 666 and 667. Data is written in these registers according to a write signal 665. The registers 661 and 662 are respectively connected to output buffers 663 and 664 having output enable terminals. When the output buffer 663 outputs data simultaneously with a chip select signal 668, the content of the register 661 is read out onto the data bus 541; when the output buffer 664 outputs data simultaneously with chip select signals 670 and 671, the content of the register 662 is read out onto the data bus 541.

The converter circuit will be described in more detail with reference to FIGS. 28 and 41. From data before conversion shown in FIG. 28, the content [(1) (2) (2) (3) (4) (4) (5) (6)] at address 0100H on the RAM 10 513 is read and stored in the register 661, and the content [(17) (18) (18) (19) (20) (20) (21) (21)] at address 0103H on the RAM 513 is read and stored in the register 662. In this state, the chip select signal 668 is enabled to read out data output from the output buffer 663, and the readout data is stored at address 0300H on the RAM 513. The chip select signal 670 is then enabled to read out data output from the output buffer 664, and the readout data is written at address 0303H on the RAM 513. The chip select signal 671 is enabled to read out output data from the output buffer 664, and the readout data is written at address 0306H (larger by three addresses than the latest storage address on the RAM 513). When a series of operations described above are repeated, source data shown in FIG. 28 are converted, as shown in FIG. 41, and the converted data are written in the RAM 513.

Figure 42:
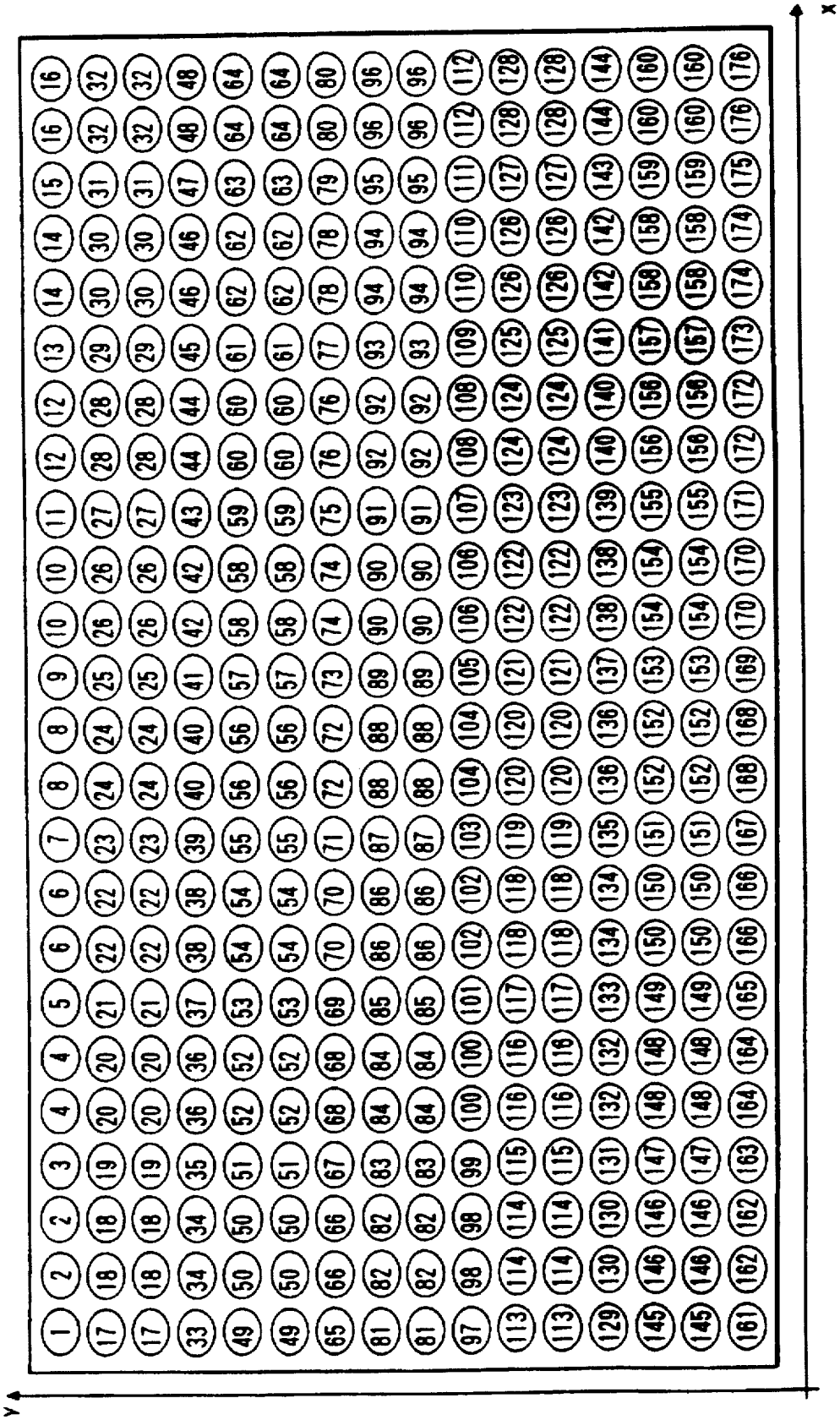
FIG. 42 is a view two-dimensionally showing the format of dot data, which is expanded in the x- and y-directions in a digital signal processing unit of the tenth embodiment.

FIG. 42 shows a state wherein image data enlarged in the x- and y-directions, as shown in FIG. 41, are developed to a two-dimensional image. Thus, the image data before conversion shown in FIG. 25 are converted, as shown in FIG. 42.

Figure 43:
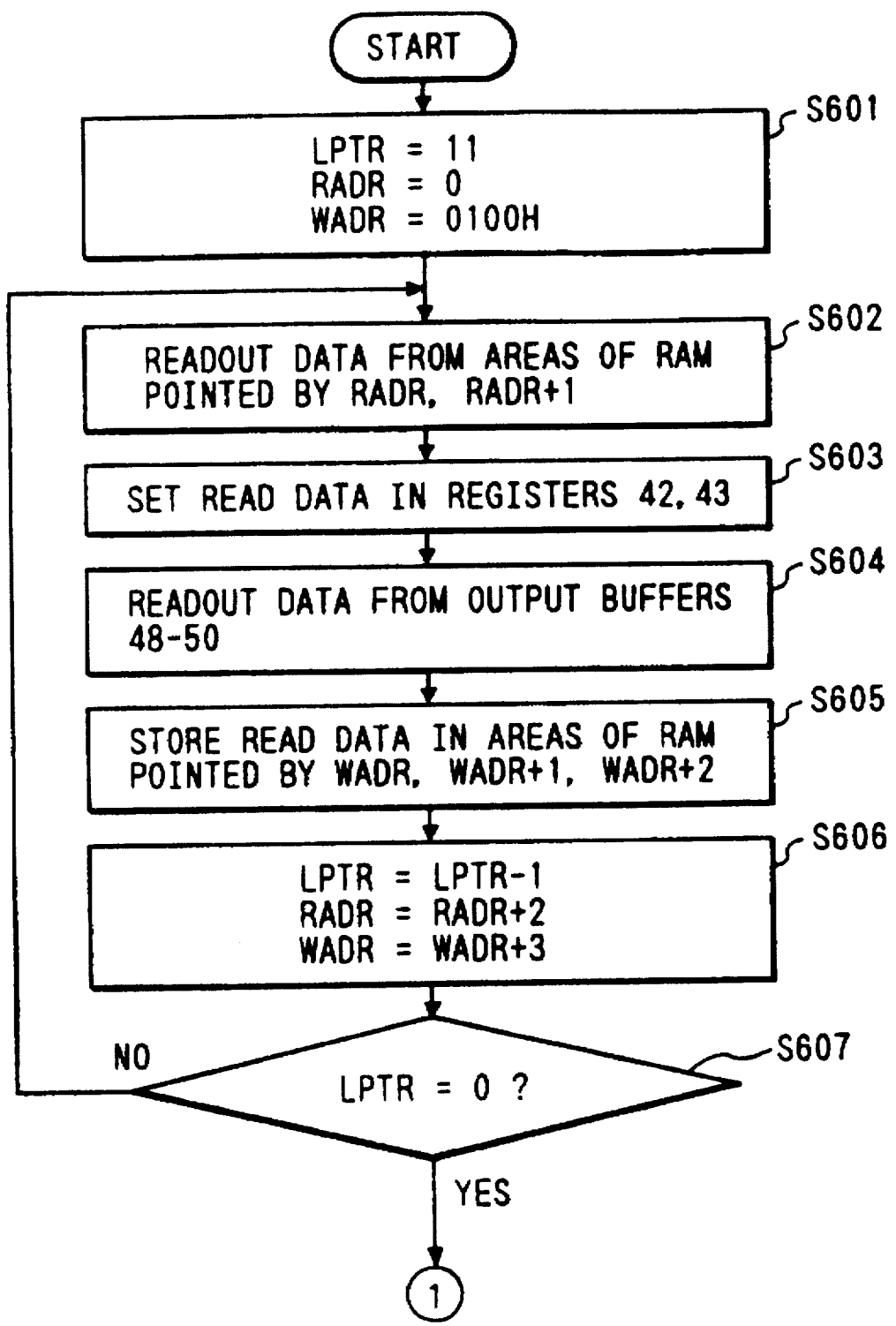
FIGS. 43 and 44 are flow charts showing the operation of the digital signal processing unit of the tenth embodiment.
Figure 44:
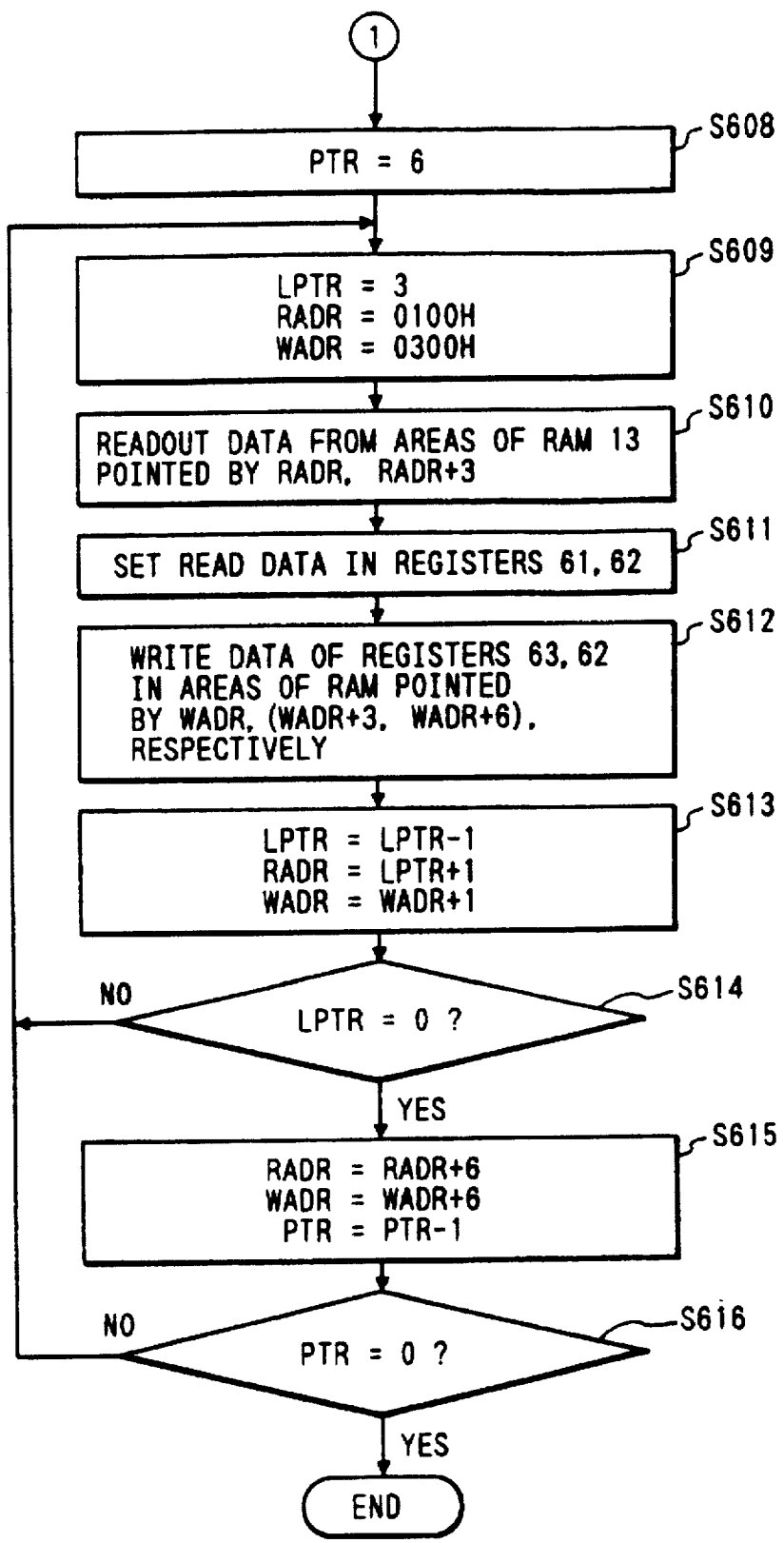

FIGS. 43 and 44 are flow charts showing the operation of the digital signal processing unit 512 of the tenth embodiment.

In step S601, "11" is set in a pointer LPTR, "0" is set in a read address pointer RADR, and "0100H" is set in a write address pointer WADR. The flow advances to step S602, and image data are read out from addresses on the RAM 513 indicated by the content of RADR and (RADR+1). In step S603, the readout data are set in the registers 542 and 543, and in step S604, data are read out from the output buffers 548 to 550. The flow advances to step S605. In step S605, data read out from the output buffer 548 is written at an address on the RAM 513 indicated by WADR; data read out from the output buffer 549, at an address on the RAM 513 indicated by (WADR+1); and data read out from the output buffer 550, at an address on the RAM 513 indicated by (WADR+3). The flow then advances to step S606. In step S606, the pointer LPTR is decremented by −1, and the read address RADR =RADR+2 and WADR=WADR+3 are executed. If it is determined in step S607 that the value of the pointer LPTR is not "0", the flow returns to step S602, and the above-mentioned processing is executed.

If it is determined in step S607 that the value of the pointer LPTR is "0", the flow advances to step S608, and "6" is set in a pointer PTR. In step S609, "3" is set in the pointer LPTR, "0100H" is set in the read address pointer RADR, and "0300H" is set in the write address pointer WADR. The flow advances to step S610 to read out data from addresses on the RAM 513 indicated by the read address pointer RADR and (RADR+3), and the readout data are respectively set in the registers 661 and 662 (step S611). The flow advances to step S612. In step S612, data is read out from the register 661, and the readout data is written at an address on the RAM 513 indicated by WADR; and data is read out from the register 662, and the readout data is written at addresses on the RAM 513 indicated by (WADR+3) and (WADR+6).

The flow advances to step S613. In step S613, the pointer LPTR is decremented by −1, and the read and write address pointers RADR and WADR are respectively incremented by +1. It is checked in step S614 if the pointer LPTR is "0". If NO in step S614, the flow returns to step S609; otherwise, the flow advances to step S615 to increment both the read and write address pointers RADR and WADR by +6. The pointer PTR is decremented by −1, and if it is determined in step S616 that the value of the pointer PTR is not "0", the flow returns to step S609 to execute the above-mentioned processing. If the value of the pointer PTR becomes "0", this processing is ended.

Figure 45:
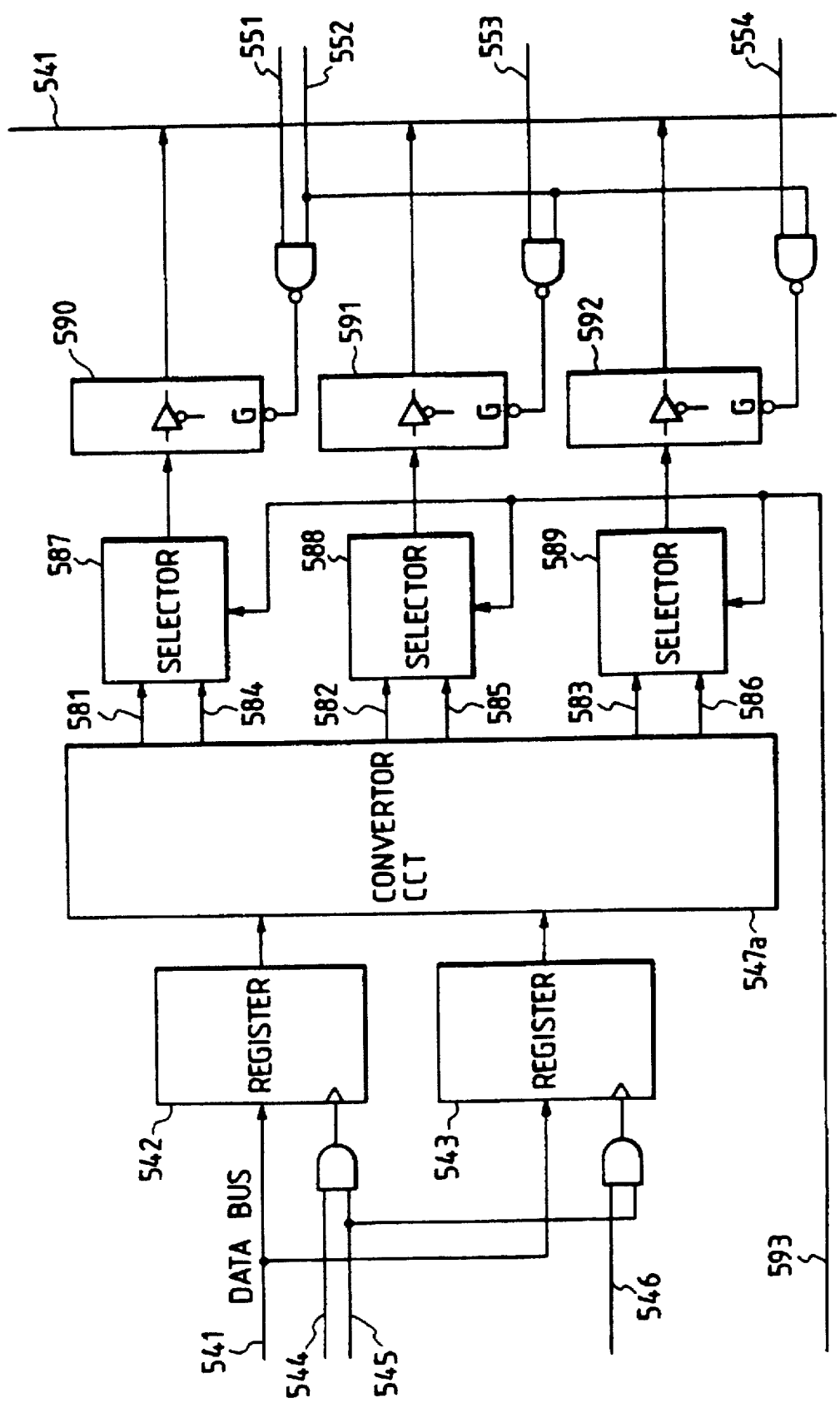
FIG. 45 is a block diagram showing another arrangement of a dot-density converter circuit.

In the above embodiment, the dot-density converter circuit in the x-direction shown in FIG. 27, and the dot-density converter circuit in the y-direction shown in FIG. 40 are arranged. FIG. 45 shows the arrangement of a dot-density converter circuit including the common portions in the circuits shown in FIGS. 27 and 40. The same reference numerals in FIG. 45 denote the same parts as in the above-mentioned drawings, and a description thereof will be omitted.

In FIG. 45, a converter circuit 547a performs processing for converting the dot density of output signals from the registers 542 and 543 in the x-direction, and processing for converting the dot density in the y-direction. The converter circuit 547a outputs dot-density converted output data 581, 582, and 583 in the x-direction, and these output data are respectively input to selectors 587, 588, and 589. The dot-density converted output data 584, 585, and 586 in the y-direction are also input to the selectors 587, 588, and 589. The selectors 587, 588, and 589 are connected to output buffers 590 to 592.

The outputs from these selectors 587,588, and 589 are switched according to a control signal 593, and are selectively output while discriminating conversion in the x-direction from conversion in the y-direction. The output data from the selectors 587, 588, and 589 are respectively input to the output buffers 590, 591, and 592.

With the above-mentioned arrangement, the conversion results of data input to the registers 542 and 543 can be selected in correspondence with two types of conversion, i.e., the conversion in the x-direction, and the conversion in the y-direction, according to the control signal 593. From the viewpoints of the circuit arrangement, only the selectors 587 to 589, and a portion of the converter circuit 547a are added, and the remaining portions are commonly used for conversion operations in the two modes, resulting in a low-cost arrangement.

The present invention may be applied to a system constituted by a plurality of devices, or an apparatus consisting of one device. The present invention can also be applied to a case wherein the present invention is attained by supplying a program for executing processing defined by the present invention to a system or apparatus.

As described above, according to this embodiment, since two types of conversion circuits in the x- and y-directions are arranged for dot data such as image data, dot data representing a plane can be enlarged and reduced in the x- and y-directions. Of course, conversion in only one direction may be performed depending on data.

The two types of hardware arrangements for performing dot-density conversion operations in the x-and y-directions are simplified as a common arrangement, thus realizing a more inexpensive arrangement.

In this manner, when the dot-density conversion function of this embodiment is provided, the dot density of image data from, e.g., a facsimile apparatus having a resolution of 200 dpi is increased, and the dot-density converted data can be printed at the same magnification by, e.g., a 360-dpi printer.

The present invention is not limited to the above embodiments, and various other changes and modifications may be made within the spirit and scope of the invention.

What is claimed is:

1. A document processing apparatus having a document processing function and a communication function, comprising:

first memory means for storing data;

second memory means for storing data;

saving means for, when the communication function is executed during execution of the document processing function, saving data, which relates to the document processing, and which is stored in said first memory means, in said second memory means;

means for performing the communication function by using said first memory means;

restoration means for, when performance of the communication function is ended, restoring the data saved in said second memory means by said saving means to said first memory means; and selection means for selecting between execution/non-execution of saving by said saving means.

2. An apparatus according to claim 1, wherein said selection means includes a switch for selecting execution/non-execution of said saving means, and display means for displaying a message for an operation of said switch.

3. A document processing method for use in a document processing apparatus having a document processing function and a communication function, comprising the steps of:

storing data in a first memory means;

storing data in a second memory means;

when the communication function is executed during execution of the document processing function, saving data, which relates to the document processing and which is stored in the first memory means, in the second memory means;

performing the communication function by using the first memory means;

when performance of the communication function is ended, restoring the data which has been saved in the second memory means in said saving step, to the first memory means; and selecting execution/non-execution of said saving step.

4. A method according to claim 3, wherein said selecting step is performed using a switch for selecting execution/non-execution of said saving step, and further comprising the step of displaying a message for an operation of the switch.

5. A document processing apparatus having a document processing function and a facsimile function, comprising:

first memory means for storing data;

second memory means for storing data;

selection means for selecting the facsimile function during execution of the document processing function;

saving means for, when said selection means selects the facsimile function, saving data, which relates to the document processing, and which is stored in said first memory means, to said second memory means;

means for performing the facsimile function by using said first memory means;

restoration means for, when performance of the facsimile function is ended, restoring the data saved in said second memory means by said saving means to said first memory means; and another selection means for selecting between execution/non-execution of saving by said saving means.

6. An apparatus according to claim 5, wherein said selection means includes light-emitting means for emitting light for signaling selection of the facsimile function.

7. An apparatus according to claim 5, wherein said another selection means includes a switch for selecting execution/non-execution of the facsimile function.

8. A document processing method for use with a document processing apparatus having a document processing function and a facsimile function, comprising the steps of:

storing data in a first memory means;

storing data in a second memory means;

selecting the facsimile function during execution of the document processing function;

when the facsimile function is selected in said selecting step, saving data, which relates to the document processing, and which is stored in the first memory means, to the second memory means;

performing the facsimile function by using the first memory means;

when performance of the facsimile function is ended, restoring the data saved in the second memory means in said saving step, to the first memory means; and a separate selecting step, of selecting execution/non-execution of said first-mentioned saving step.

9. A method according to claim 8, wherein said facsimile function selecting step includes emitting light for signaling selection of the facsimile function.

10. A document processing method for use with a document processing apparatus having a document processing function and a facsimile function, comprising the steps of:

storing data in a first memory means;

storing data in a second memory means;

selecting the facsimile function during execution of the document processing function;

when the facsimile function is selected in said selecting step, saving data, which relates to the document processing, and which is stored in the first memory means, to the second memory means;

performing the communication function by using the first memory means;

when performance of the facsimile function is ended, restoring the data saved in the second memory means in said saving step, to the first memory means; and a separate selecting step, of selecting execution/non-execution of said first-mentioned saving step, wherein said separate selecting step is performed using a switch for selecting execution/non-execution of the facsimile function.

* * * * *